US011503919B2

(12) United States Patent
Alletto, Jr.

(10) Patent No.: US 11,503,919 B2
(45) **Date of Patent: *Nov. 22, 2022**

(54) INDEPENDENT SUSPENSION SPRING ASSEMBLY

(71) Applicant: BEDGEAR LLC, Farmingdale, NY (US)

(72) Inventor: Eugene Alletto, Jr., Glen Head, NY (US)

(73) Assignee: BEDGEAR, LLC, Farmingdale, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/616,269

(22) Filed: Jun. 7, 2017

(65) Prior Publication Data

US 2017/0354267 A1 Dec. 14, 2017

Related U.S. Application Data

(60) Provisional application No. 62/347,199, filed on Jun. 8, 2016.

(51) Int. Cl.
*A47C 27/06* (2006.01)
*F16F 3/04* (2006.01)
(Continued)

(52) U.S. Cl.
CPC ........ *A47C 27/064* (2013.01); *A47C 27/0453* (2013.01); *A47C 27/062* (2013.01); *A47C 27/07* (2013.01); *F16F 3/04* (2013.01)

(58) Field of Classification Search
CPC ... A47C 27/064; A47C 27/0453; A47C 27/07; A47C 27/062; F16F 3/04
See application file for complete search history.

(56) References Cited

U.S. PATENT DOCUMENTS

| | | | | |
|---|---|---|---|---|
| 685,160 A | | 10/1901 | James | |
| 2,567,520 A | * | 9/1951 | McInerney | B60N 2/7064 267/93 |

(Continued)

FOREIGN PATENT DOCUMENTS

| | | | | | |
|---|---|---|---|---|---|
| AU | 2016100357 A4 | * | 6/2016 | | A47C 27/064 |
| CN | 105725582 A | * | 7/2016 | | |

(Continued)

OTHER PUBLICATIONS

International Search Report and Written Opinion of the International Searching Authority, European Patent Office, PCT/US2017/036147, dated Dec. 20, 2018.

(Continued)

*Primary Examiner* — David R Hare
*Assistant Examiner* — Alexis Felix Lopez
(74) *Attorney, Agent, or Firm* — Sorell, Lenna & Schmidt, LLP

(57) ABSTRACT

A spring assembly is provided that includes a plurality of first strings of springs and a plurality of second strings of springs. Each of the first strings are joined to at least another one of the first strings or one of the second strings. Each of the first strings includes first and second plies of fabric that define a plurality of pockets formed along a length of the first string. The pockets are formed by vertical seams that join the plies. The vertical seams each include an upper slit that extends through a top surface of the first string and a lower slit that extends through a bottom surface of the first string. Each of the pockets have at least one spring positioned therein.

20 Claims, 17 Drawing Sheets

(51) Int. Cl.
*A47C 27/045* (2006.01)
*A47C 27/07* (2006.01)

(56) References Cited

U.S. PATENT DOCUMENTS

| | | | | | |
|---|---|---|---|---|---|
| 3,083,381 | A * | 4/1963 | Bailey | A47C 27/081 219/217 |
| 4,523,344 | A | 6/1985 | Stumpf et al. | |
| 5,319,815 | A * | 6/1994 | Stumpf | A47C 27/064 5/720 |
| 6,826,796 | B1 * | 12/2004 | Mossbeck | A47C 27/064 5/655.8 |
| 6,883,196 | B2 | 4/2005 | Barber | |
| 7,178,187 | B2 | 2/2007 | Barman et al. | |
| 7,908,693 | B2 | 3/2011 | DeMoss | |
| 8,978,183 | B1 * | 3/2015 | Richmond | A47C 27/062 5/655.8 |
| 9,226,591 | B2 | 1/2016 | Defranks et al. | |
| 9,974,395 | B2 | 5/2018 | Pennington et al. | |
| 2004/0172767 | A1 * | 9/2004 | Mossbeck | A47C 27/064 5/721 |
| 2007/0094807 | A1 * | 5/2007 | Wells | A47C 27/065 5/248 |
| 2007/0289068 | A1 | 12/2007 | Edling | |
| 2010/0212090 | A1 | 8/2010 | Stjerna | |
| 2010/0257675 | A1 * | 10/2010 | DeMoss | A47C 27/064 5/720 |
| 2013/0031726 | A1 | 2/2013 | DeMoss | |
| 2013/0127101 | A1 * | 5/2013 | Rasbach | B60G 11/15 267/290 |
| 2014/0373280 | A1 * | 12/2014 | Mossbeck | A47C 27/064 5/718 |
| 2014/0373282 | A1 * | 12/2014 | Mossbeck | A47C 27/05 267/142 |
| 2015/0359350 | A1 * | 12/2015 | Eigenmann | A47C 27/05 5/655.8 |
| 2016/0227938 | A1 * | 8/2016 | Pennington | A47C 27/07 |

FOREIGN PATENT DOCUMENTS

| | | | | | |
|---|---|---|---|---|---|
| DE | 19506422 | A1 * | 8/1996 | B21F 3/00 |
| EP | 1127521 | A1 * | 8/2001 | A47C 27/062 |
| EP | 2923610 | A1 * | 9/2015 | A47C 23/0435 |
| EP | 2611335 | B1 * | 12/2015 | A47C 27/001 |
| GB | 724812 | A * | 2/1955 | F16F 1/128 |
| KR | 200337232 | Y1 * | 12/2003 | |
| KR | 20160011266 | A * | 2/2016 | A47C 27/064 |
| WO | WO-0126507 | A1 * | 4/2001 | A47C 27/064 |
| WO | WO-2005102115 | A1 * | 11/2005 | A47C 27/064 |
| WO | 2008145185 | A1 | 12/2008 | |
| WO | WO-2011150080 | A1 * | 12/2011 | A47C 23/00 |
| WO | 2013060983 | A1 | 5/2013 | |
| WO | WO-2013060983 | A1 * | 5/2013 | A47C 27/064 |
| WO | WO-2017116406 | A1 * | 7/2017 | A47C 27/064 |

OTHER PUBLICATIONS

International Search Report and Written Opinion of the International Searching Authority—European Patent Office, PCT/US2017/036147 dated Oct. 11, 2017.

EPO Examination Report, App. No. 17 729 745.4, dated Nov. 27, 2020.

EPO Communication, App. No. 17 729 745.4, dated Jan. 19, 2015

International Preliminary Report on Patentability PCT/US2017/036147 citing D1-D4.

European Patent Office, Postbus 5818, 2280 HV Rijswijk, Netherlands, Application No. 17729745.4, Communication pursuant to Article 94(3) EPC, dated Oct. 22, 2021.

Israel Patent Office, Israeli Patent Application No. 263576, 1st examination report dated Jan. 17, 2022.

* cited by examiner

INDEPENDENT SUSPENSION SPRING ASSEMBLY

TECHNICAL FIELD

The present disclosure generally relates to systems that include a temperature controlled bed system configured to draw ambient air away from a sleeping surface of a mattress. Methods of use are included.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Mattresses may include a plurality of springs that form a spring assembly. One side of a mattress can wear out over time, while the opposite side is maintained in a relatively new state. Moreover, when one or more sleepers consistently sleep on one side of a mattress, weight from the sleeper or sleepers' body(ies) can cause permanent depressions in the mattress. As such, many mattress manufactures of mattresses with spring assemblies suggest flipping a mattress at least once a year to increase the life of the mattress and/or prevent sagging or the creation of depressions in the mattress.

Some conventional spring assemblies position at least some of the springs in pockets to create strings of springs that are arranged to form the spring assembly. However, these spring assemblies do not allow for independent movement between adjacent springs or allow for independent movement between adjacent springs on both sides of the spring assembly. As such, there is no independent movement between adjacent springs when the mattress is flipped over. This disclosure describes an improvement over these prior art technologies.

SUMMARY

In one embodiment, in accordance with the principles of the present disclosure, a spring assembly is provided that includes a plurality of first strings of springs and a plurality of second strings of springs. Each of the first strings is joined to at least another one of the first strings or one of the second strings. Each of the first strings includes first and second plies of fabric that define a plurality of pockets formed along a length of the first string. The pockets are formed by vertical seams that join the plies. The vertical seams each include an upper slit that extends through a top surface of the first string and a lower slit that extends through a bottom surface of the first string. Each of the pockets includes at least one spring positioned therein.

In one embodiment, in accordance with the principles of the present disclosure, a spring assembly is provided that includes a first zone comprising a plurality of first strings of springs and a second zone comprising a plurality of second strings of springs. Each of the first strings is joined to another one of the first strings or one of the second strings. The first strings have a first configuration and the second strings have a second configuration that is different than the first configuration. Each of the first strings comprises first and second plies of fabric that define a plurality of first pockets formed along a length of the first string by first vertical seams that join the plies. The first vertical seams each include an upper slit that extends through a top surface of the first string and a lower slit that extends through a bottom surface of the first string. Each of the first pockets comprises at least one spring positioned therein. In some embodiments, each of the second strings comprises third and fourth plies of fabric that define a plurality of second pockets formed along a length of the second string by second vertical seams that join the third and fourth plies, the second vertical seams being free of any slits that extend through a top surface of the second string and free of any slits that extend through a bottom surface of the second string, each of the second pockets comprising at least one spring positioned therein. In some embodiments, each of the first and second pockets comprises only one spring positioned therein. In some embodiments, each of the first pockets comprises only one spring positioned therein and each of the second pockets comprises more than one spring positioned therein. In some embodiments, each of the first pockets comprises more than one spring positioned therein and each of the second pockets comprises more than one spring positioned therein. In some embodiments, the first zone comprises a plurality of first zones and the second zone comprises a plurality of second zones, the first zones being spaced apart by one of the second zones. In some embodiments, the first zone comprises a plurality of first zones and the second zone comprises first, second and third regions and the second zone comprises fourth and fifth regions, the first and second regions being spaced apart from one another by the fourth region and the second and third regions being spaced apart from one another by the fifth region. In some embodiments, the first region is configured to support a sleeper's head while the second region supports the sleeper's midsection and the third region supports the sleeper's legs. In some embodiments, the first region is divided into separate sections, the second zone extending between the separate sections.

In one embodiment, in accordance with the principles of the present disclosure, a mattress is provided that includes a spring assembly comprising a first zone comprising a plurality of first strings of springs and a second zone comprising a plurality of second strings of springs, each of the first strings being joined to another one of the first strings or one of the second strings. Each of the first strings comprises first and second plies of fabric that define a plurality of first pockets formed along a length of the first string by first vertical seams that join the plies. The first vertical seams each include an upper slit that extends through a top surface of the first string and a lower slit that extends through a bottom surface of the first string. Each of the first pockets comprises at least one spring positioned therein. Each of the second strings comprises third and fourth plies of fabric that define a plurality of second pockets formed along a length of the second string by second vertical seams that join the third and fourth plies. The second vertical seams are free of any slits that extend through a top surface of the second string and free of any slits that extend through a bottom surface of the second string. Each of the second pockets comprises at least one spring positioned therein. The first zone comprises a plurality of first zones and the second zone comprises a plurality of second zones, the first zones being spaced apart by one of the second zones. The mattress comprises a cushioning material positioned above the top surfaces and a base material positioned below the bottom surfaces.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

The exemplary embodiments of the disclosed spring assemblies are discussed in terms of strings of pocketed springs that are used to form one or more spring assemblies that make up all or a portion of a mattress. Reference will now be made in detail to the exemplary embodiments of the present disclosure, which are illustrated in the accompanying figures. Turning to FIGS. 1-22, there are illustrated components of a spring assembly 30 and a mattress 30*a* that includes spring assembly 30.

Figure 3:
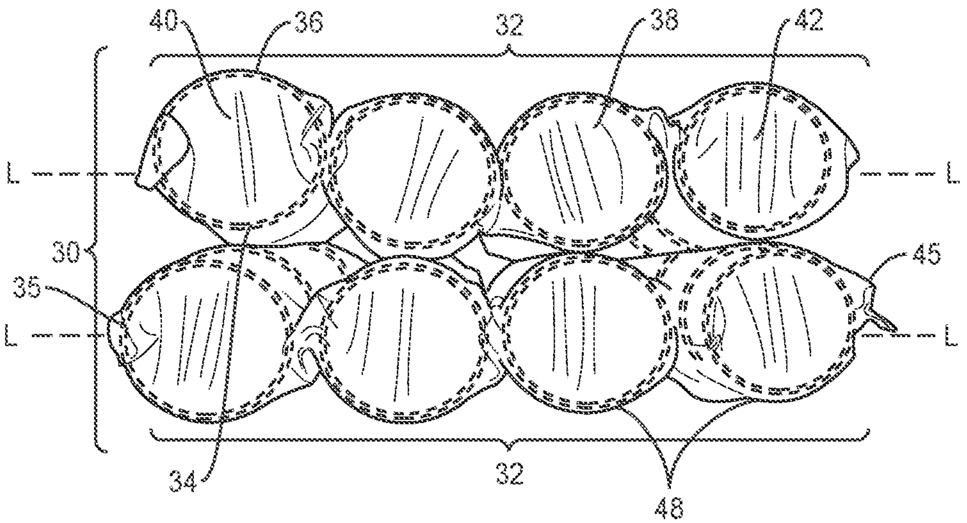
FIG. 3 is a top, perspective view, in part phantom, of the spring assembly shown in FIG. 1.
Figure 4:
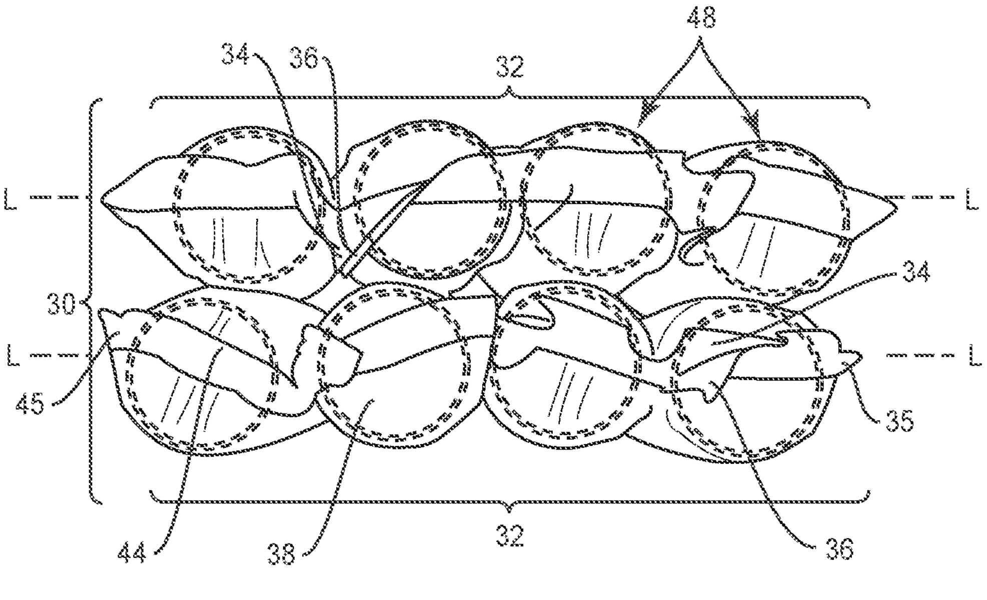
FIG. 4 is a bottom, perspective view, in part phantom, of the spring assembly shown in FIG. 1.

Spring assembly 30 includes one or a plurality of first strings, such as, for example, strings 32. Strings 32 each include a first ply of fabric 34 and a second ply of fabric 36, as best shown in FIGS. 3 and 4. In some embodiments, plies 34, 36 are formed by folding a single piece of material, such as for example, material 38. That is, first ply 34 may be a first end of material 38 and second ply 36 may be a second end of material 38, wherein material 38 is folded about a midsection 40 of material 38, as best shown in FIG. 3. In some embodiments, material 38 is arranged such that midsection 40 forms a top surface 42 of string 32 and plies 34, 36 are joined at an opposite bottom surface 44 of string 32, as shown in FIGS. 3 and 4. It is envisioned that this configuration may be reversed such that midsection 40 forms bottom surface 44 of string 32 and plies 34, 36 are joined at top surface 42 of string 32. In some embodiment, material 38 can comprise acrylic, acetate, cotton, linen, silk, polyester, wool, nylon, rayon, spandex, lycra, hemp, man-made materials, natural materials (e.g., hemp) and blends and/or combinations thereof.

Figure 2:
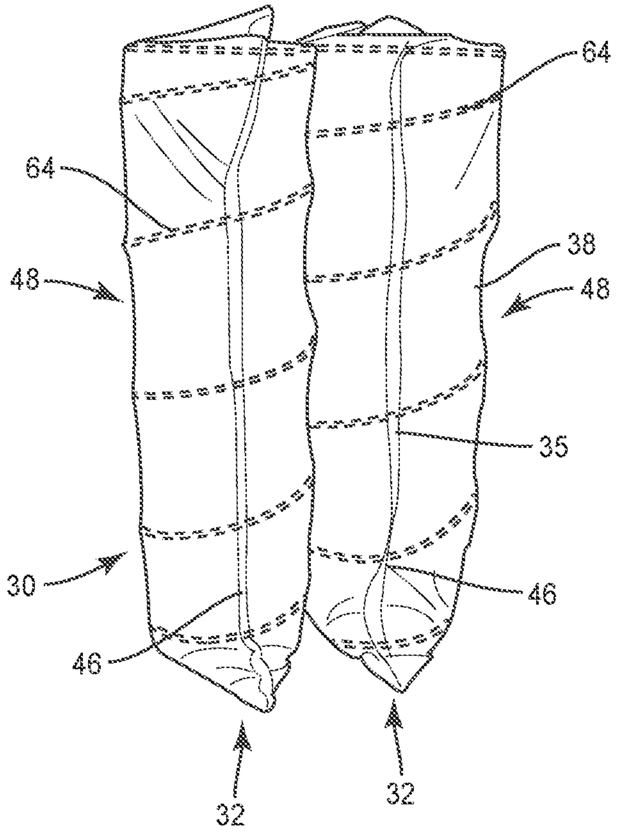
FIG. 2 is an end, perspective view, in part phantom, of the spring assembly shown in FIG. 1.

Strings 32 each extend along a longitudinal axis L between opposite ends 35, 45 of strings 32. Plies 34, 36 are joined together at spaced apart portions of material 38 by vertical seams 46 to define a plurality of pockets 48 along longitudinal axis L. Vertical seams 46 define an end surface of end 35 and an end surface of end 45, as shown in FIGS. 2-4. In some embodiment, strings 32 each include the same number of pockets 48. In some embodiment, strings 32 each include different numbers of pockets 48. It is envisioned that strings 32 may each include any number of pockets 48. In some embodiments, strings 32 each include between about 2 and about 40 pockets 48. In some embodiments, strings 32 each include about 3 pockets 48, about 4 pockets 48, about 5 pockets 48, about 6 pockets 48, about 7 pockets 48, about 8 pockets 48, about 9 pockets 48, about 10 pockets 48, about 11 pockets 48, about 12 pockets 48, about 13 pockets 48, about 14 pockets 48, about 15 pockets 48, about 16 pockets 48, about 17 pockets 48, about 18 pockets 48, about 19 pockets 48, about 20 pockets 48, about 21 pockets 48, about 22 pockets 48, about 23 pockets 48, about 24 pockets 48, about 25 pockets 48, about 26 pockets 48, about 27 pockets 48, about 28 pockets 48, about 29 pockets 48, about 30 pockets 48, about 31 pockets 48, about 32 pockets 48, about 33 pockets 48, about 34 pockets 48, about 35 pockets 48, about 36 pockets 48, about 37 pockets 48, about 38 pockets 48, or about 39 pockets 48.

In some embodiments, vertical seams 46 are evenly spaced apart from one another along longitudinal axis L such that each of pockets 48 has the same width, the width of each of pockets 48 being defined by the distance from one of vertical seams 46 to an adjacent one of vertical seams 46. In some embodiments, vertical seams 46 are not evenly spaced apart from one another along longitudinal axis L such that at least one of pockets 48 have a width that is different than a width another one of other pockets 48, the widths of pockets 48 being defined by the distance from one of vertical seams 46 to an adjacent one of vertical seams 46. Vertical seams 46 each have a length defined by the distance from top surface 42 to bottom surface 44. In some embodiments, vertical seams 46 each have the same length. In some embodiments, the length of at least one of vertical seams 46 is different than the length of at least another one of vertical seams 46.

Figure 1:
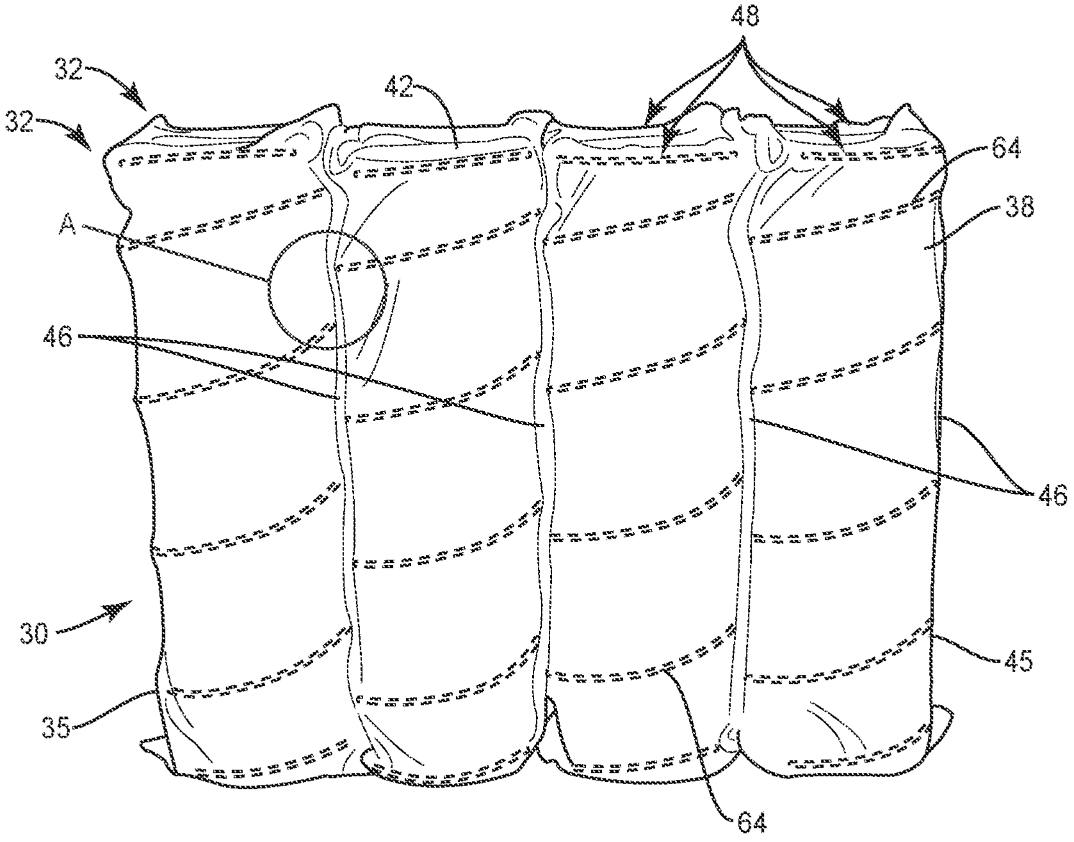
FIG. 1 is a side, perspective view, in part phantom, of a spring assembly in accordance with the principles of the present disclosure.
Figure 1A:
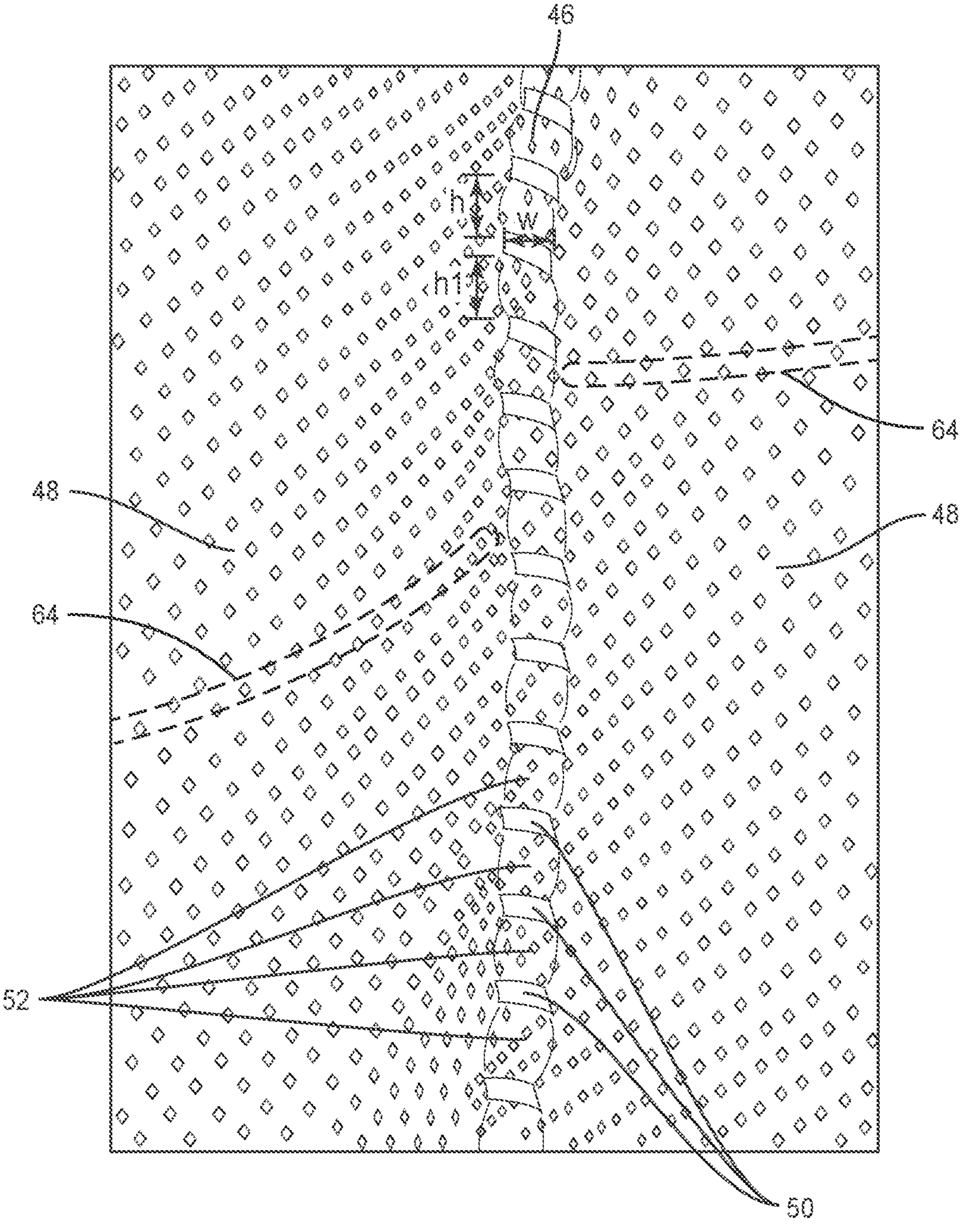
FIG. 1A is a side, close up view of a portion of the spring assembly shown in FIG. 1 at Detail A in FIG. 1.

In some embodiments, vertical seams 46 are formed by sewing, adhering, or welding first ply 34 to second ply 36 along at least a portion of the length of each vertical seam 46. In some embodiments, vertical seams 46 are formed by a horizontal weld 50. In some embodiments, horizontal weld 50 comprises a series of horizontal welds 50 that each extend parallel to or substantially parallel to longitudinal axis L and are spaced apart from one another along the length of vertical seam 46, as shown in FIG. 1A. In some embodiments, horizontal weld(s) 50 define a section or section of each vertical seam 46 in which first ply 34 is joined with second ply 36. In some embodiments, horizontal weld(s) 50 are formed by thermal welding and/or ultrasonic welding. In some embodiments, horizontal weld(s) 50 are spaced apart from one another by portions 52 of vertical seam 46. In some embodiments, first ply 34 is spaced apart from second ply 36 at portions 52. That is, first ply 34 is not joined with second ply 36 at portions 52.

In some embodiments, horizontal welds 50 each have a width w along longitudinal axis L that is greater than a height h of horizontal welds 50 along a length of vertical seam 46, as shown in FIG. 1A. In some embodiments, width w is about 1.25 to about 5 times greater than height h. In some embodiments, width w is about 1.5 times greater than height h, about 2 times greater than height h, about 2.5 times greater than height h, about 3 times greater than height h, about 3.5 times greater than height h, about 4 times greater than height h, or about 4.5 times greater than height h. Portions 52 each have a width along longitudinal axis L that is equal to width w. In some embodiments, portions 52 each have a height h1 that is equal to height h. In some embodiments, height h1 is greater than height h. In some embodiments, height h1 is less than height h.

In some embodiments, horizontal weld(s) 50 may be disposed at alternate orientations, relative to longitudinal axis L, such as, for example, transverse and/or other angular orientations such as acute or obtuse, co-axial and/or may be offset or staggered. In some embodiments, horizontal weld(s) 50 may have various shapes or configurations, such as, for example, oval, oblong, triangular, rectangular, square, polygonal, irregular, uniform, non-uniform, variable, tubular and/or tapered.

In some embodiments, vertical seams 46 are formed by a vertical weld 54. In some embodiments, vertical weld 54 comprises a series of vertical welds 54 that each extend perpendicular or substantially perpendicular to longitudinal axis L and are spaced apart from one another along the length of vertical seam 46, as shown in FIGS. 5-10. In some embodiments, vertical weld(s) 54 define a section or section of each vertical seam 46 in which first ply 34 is joined with second ply 36. In some embodiments, vertical weld(s) 54 are formed by thermal welding and/or ultrasonic welding. In some embodiments, vertical weld(s) 54 are spaced apart from one another by portions 56 of vertical seam 46. In some embodiments, first ply 34 is spaced apart from second ply 36 at portions 56. That is, first ply 34 is not joined with second ply 36 at portions 56.

Figure 5:
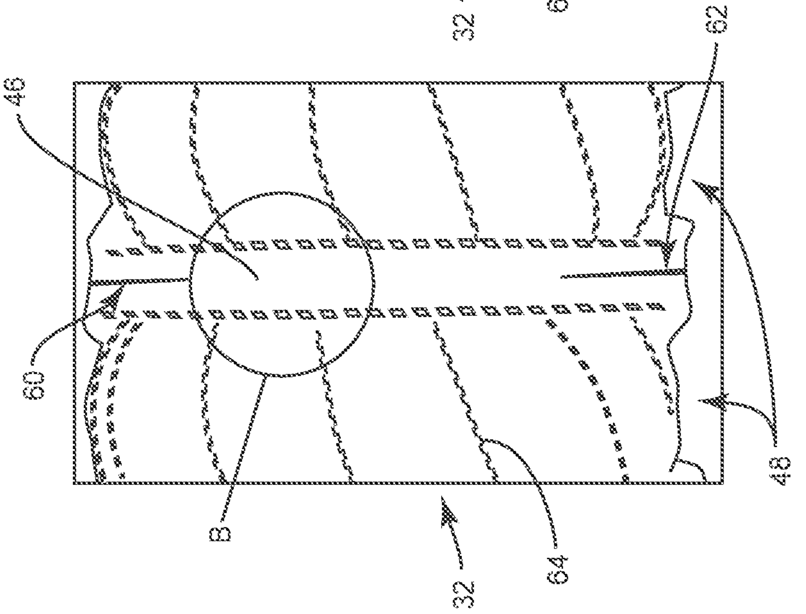
FIG. 5 is a side view, in part phantom, of a portion of one embodiment of a component of the spring assembly shown in FIG. 1.
Figure 5A:
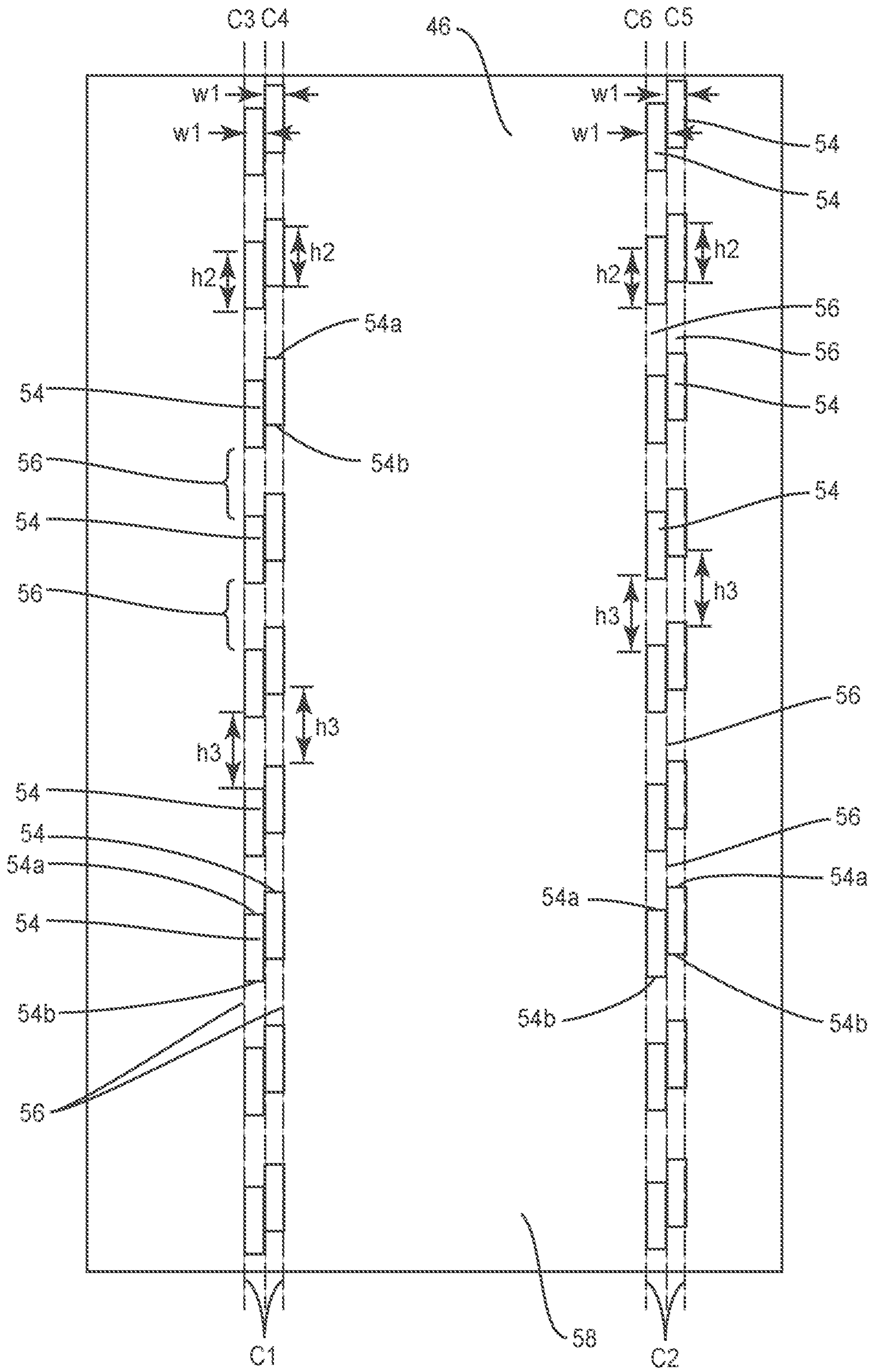
FIG. 5A is a side, close up view of a portion of the spring assembly shown in FIG. 5 at Detail B in FIG. 5.

In some embodiments, vertical welds 54 each have a width w1 along longitudinal axis L that is less than a height h2 of vertical welds 54 along a length of vertical seam 46, as shown in FIG. 5A. In some embodiments, height h2 is about 1.25 to about 5 times greater than width w1. In some embodiments, height h2 is about 1.5 times greater than width w1, about 2 times greater than width w1, about 2.5 times greater than width w1, about 3 times greater than width w1, about 3.5 times greater than width w1, about 4 times greater than width w1, or about 4.5 times greater than width w1. Portions 56 each have a width along longitudinal axis L that is equal to width w1. In some embodiments, portions 56 each have a height h3 that is equal to height h2. In some embodiments, height h3 is greater than height h2. In some embodiments, height h3 is less than height h2.

In some embodiments, vertical weld(s) 54 may be disposed at alternate orientations, relative to longitudinal axis L, such as, for example, transverse and/or other angular orientations such as acute or obtuse, co-axial and/or may be offset or staggered. In some embodiments, vertical weld(s) 54 may have various shapes or configurations, such as, for example, oval, oblong, triangular, rectangular, square, polygonal, irregular, uniform, non-uniform, variable, tubular and/or tapered.

In some embodiments, vertical seams 46 are each defined by a column C1 of vertical welds 54 and a column C2 of vertical welds 54 that is spaced apart from column C1 by a section 58, as shown in FIG. 5A. In some embodiments, first ply 34 is spaced apart from second ply 36 at section 58. That is, first ply 34 is not joined with second ply 36 at section 58. In some embodiments, column C1 and/or column C2 each include a single column of vertical welds 54.

In some embodiments, column C1 includes an outer column C3 of vertical welds 54 and an inner column C4 of vertical welds 54 and column C2 includes an outer column C5 of vertical welds 54 and an inner column C6 of vertical welds 54, as shown in FIG. 5A. Columns C4, C6 are spaced apart from one another by section 58. In some embodiments, vertical welds 54 in column C3 engage vertical welds 54 in column C4. In some embodiments, vertical welds 54 in column C3 are spaced apart from vertical welds 54 in column C4 along longitudinal axis L. In some embodiments, vertical welds 54 in column C5 engage vertical welds 54 in column C6. In some embodiments, vertical welds 54 in column C5 are spaced apart from vertical welds 54 in column C6 along longitudinal axis L.

In some embodiments, vertical welds 54 in column C3 that engage vertical welds 54 in column C4 are staggered such that a top surface 54*a* of a vertical weld 54 in column C3 is offset along column C1 from a top surface 54*a* of the vertical weld 54 in column C4 that the vertical weld 54 in column C3 engages; and a bottom surface 54*b* of the vertical weld 54 in column C3 is offset along column C1 from a bottom surface 54*b* of the vertical weld 54 in column C4 that the vertical weld 54 in column C3 engages, as shown in FIG. 5A. Likewise, vertical welds 54 in column C5 that engage vertical welds 54 in column C6 are staggered such that a top surface 54*a* of a vertical weld 54 in column C5 is offset along column C2 from a top surface 54*a* of the vertical weld 54 in column C6 that the vertical weld 54 in column C5 engages; and a bottom surface 54*b* of the vertical weld 54 in column C5 is offset along column C2 from a bottom surface 54*b* of the vertical weld 54 in column C6 that the vertical weld 54 in column C5 engages, as also shown in FIG. 5A.

In some embodiments, a top surface 54*a* of one of vertical welds 54 in column C3 is coaxial with a top surface 54*a* of one of vertical welds 54 in column C6, as shown in FIG. 5A. Likewise, a bottom surface 54*b* of one of vertical welds 54 in column C3 is coaxial with a bottom surface 54*b* of one of vertical welds 54 in column C6. In some embodiments, a top surface 54*a* of one of vertical welds 54 in column C4 is coaxial with a top surface 54*a* of one of vertical welds 54 in column C5, as shown in FIG. 5A. Likewise, a bottom surface 54*b* of one of vertical welds 54 in column C4 is coaxial with a bottom surface 54*b* of one of vertical welds 54 in column C5.

In some embodiments, heights h2 of vertical welds 54 in column C3 are the same as heights h2 of vertical welds 54 in column C4. In some embodiments, heights h2 of vertical welds 54 in column C3 are less than heights h2 of vertical welds 54 in column C4. In some embodiments, heights h2 of vertical welds 54 in column C3 are greater than heights h2 of vertical welds 54 in column C4. In some embodiments, heights h2 of vertical welds 54 in column C5 are the same as heights h2 of vertical welds 54 in column C6. In some embodiments, heights h2 of vertical welds 54 in column C5 are less than heights h2 of vertical welds 54 in column C6. In some embodiments, heights h2 of vertical welds 54 in column C5 are greater than heights h2 of vertical welds 54 in column C6.

In some embodiments, one or more of vertical seams 46 include an upper slit, such as, for example, a slit 60 that extends through top surface 42 of string 32 and/or a bottom slit, such as, for example, a slit 62 that extends through bottom surface 44 of string 32, as shown in FIGS. 5-14. In some embodiments, slits 60 extend parallel to slits 62. In some embodiments, slits 60 extend transverse to slits 62. In some embodiments, slits 60, 62 are each positioned between columns C1, C2 of one vertical seam 46. In some embodiments, slits 60, 62 are each equidistant between columns C1, C2 of one vertical seam 46. In some embodiments, at least one of slits 60, 62 is closer to one of columns C1, C2 of one vertical seam 46 than another one of columns C1, C2 of the same vertical seam 46.

Figure 7:
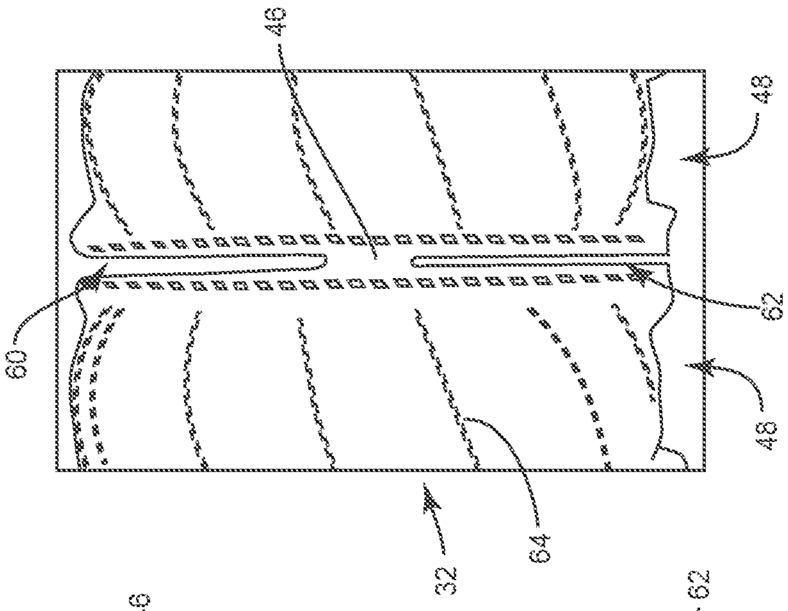
FIG. 7 is a side view, in part phantom, of a portion of one embodiment of a component of the spring assembly shown in FIG. 1.
Figure 6:
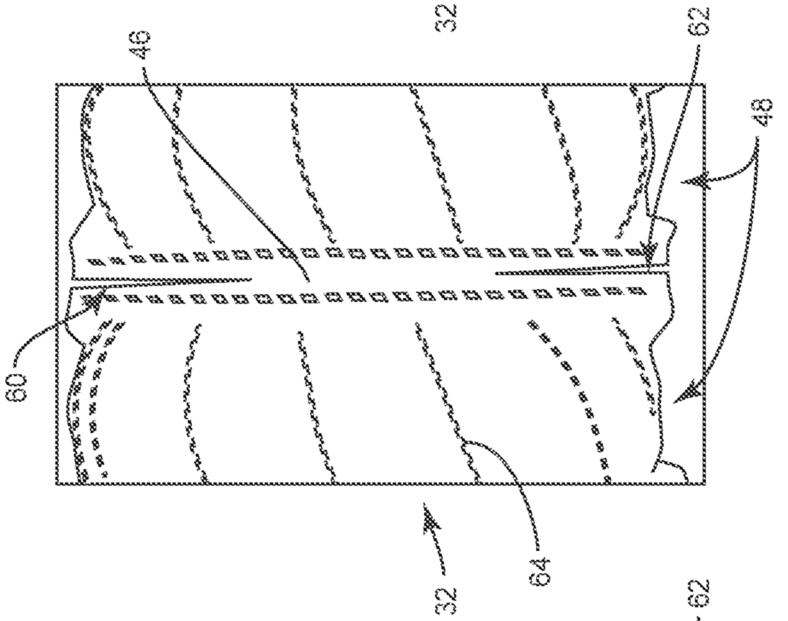
FIG. 6 is a side view, in part phantom, of a portion of one embodiment of a component of the spring assembly shown in FIG. 1.

In some embodiments, slits 60, 62 have the same length, as shown in FIGS. 5-7. This allows mattress 30*a* to be flipped such that spring assembly 30 will provide the same amount of movement between pockets 48 whether top surface 42 is positioned adjacent a sleep surface (e.g., a surface of mattress 30*a* that is furthest from the floor) or bottom surface 44 is positioned adjacent the sleep surface, as discussed herein. It is envisioned that any of slits 60, 62 can have any of the lengths shown in FIGS. 5-10.

Figure 10:
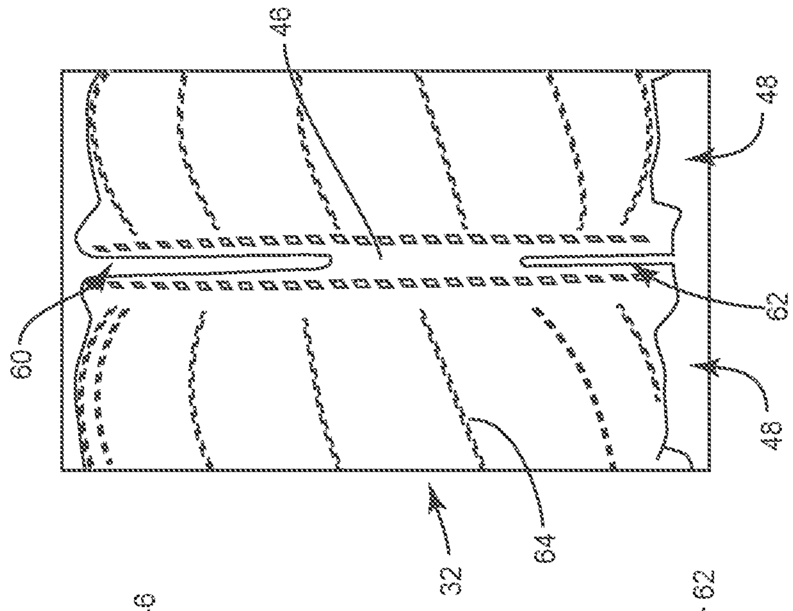
FIG. 10 is a side view, in part phantom, of a portion of one embodiment of a component of the spring assembly shown in FIG. 1.
Figure 9:
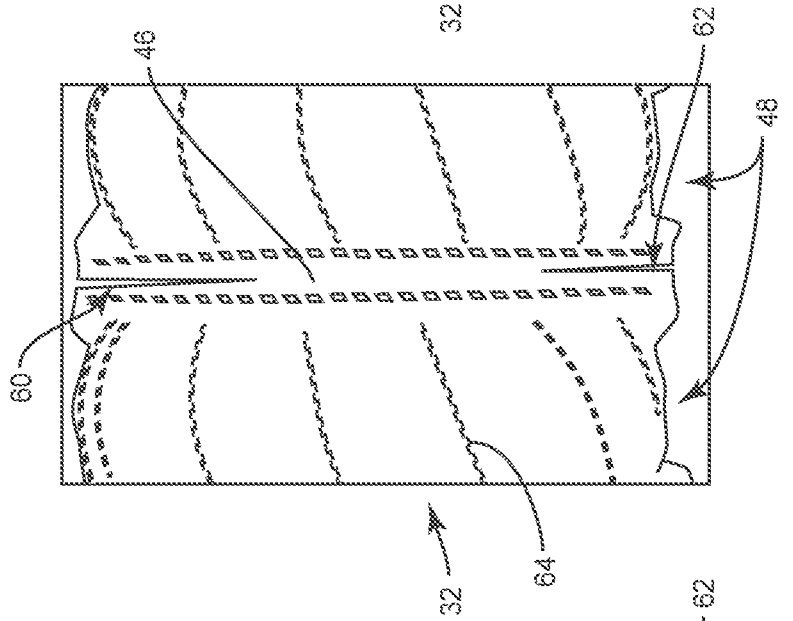
FIG. 9 is a side view, in part phantom, of a portion of one embodiment of a component of the spring assembly shown in FIG. 1.
Figure 8:
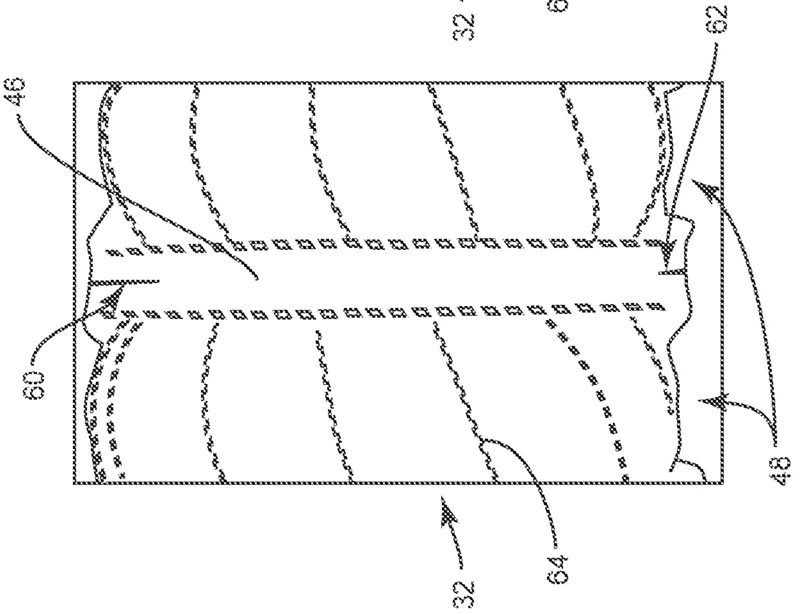
FIG. 8 is a side view, in part phantom, of a portion of one embodiment of a component of the spring assembly shown in FIG. 1.
Figure 11:
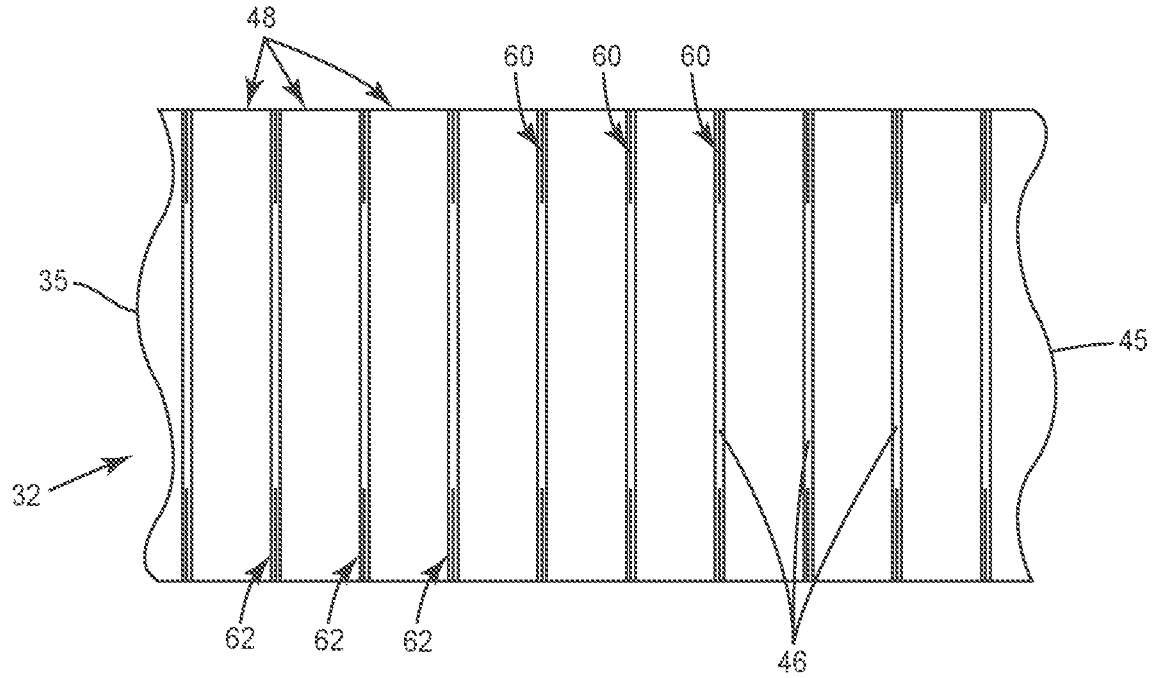
FIG. 11 is a side view of a portion of one embodiment of a component of the spring assembly shown in FIG. 1.

In some embodiments, slits 60, 62 have different lengths, as shown in FIGS. 8-10. That is, slits 60 may be longer than slits 62 or slits 62 may be longer than slits 60. This allows mattress 30*a* to be flipped to allow different amounts of movement between pockets 48. That is, when top surface 42 is positioned adjacent the sleep surface, slits 60 will allow a first amount of movement between pockets 48. When mattress 30*a* is flipped such that bottom surface 44 is positioned adjacent the sleep surface, slits 62 will allow a second amount of movement between pockets 48, wherein the first amount of movement is different than the second amount of movement. In some embodiments, the first amount of movement is greater than the second amount of movement. In some embodiments, the first amount of movement is less than the second amount of movement. In some embodiments, increasing the length of slit 60 or slit 62 increases the amount of movements between pockets 48. Likewise, decreasing the length of slit 60 or slit 62 decreases the amount of movements between pockets 48.

Slits 60, 62 can have different widths, as shown in FIGS. 5-10. In some embodiments, slits 60 and slits 62 have the same width. In some embodiments, the width of slits 60 is different than the width of slits 62. In some embodiments, the width of slits 60 is greater than the width of slits 62. In some embodiments, the width of slits 60 is less than the width of slits 62.

Strings 32 can have different configurations of slits 60, 62. In one embodiment, shown in FIG. 11, string 32 includes slits 60, 62 between each adjacent pocket 48. That is, each vertical seam 46 includes both a slit 60 and a slit 62. Slit 60 in one vertical seam 46 is parallel and/or coaxial with slit 62 in the same vertical seam 46.

Figure 12:
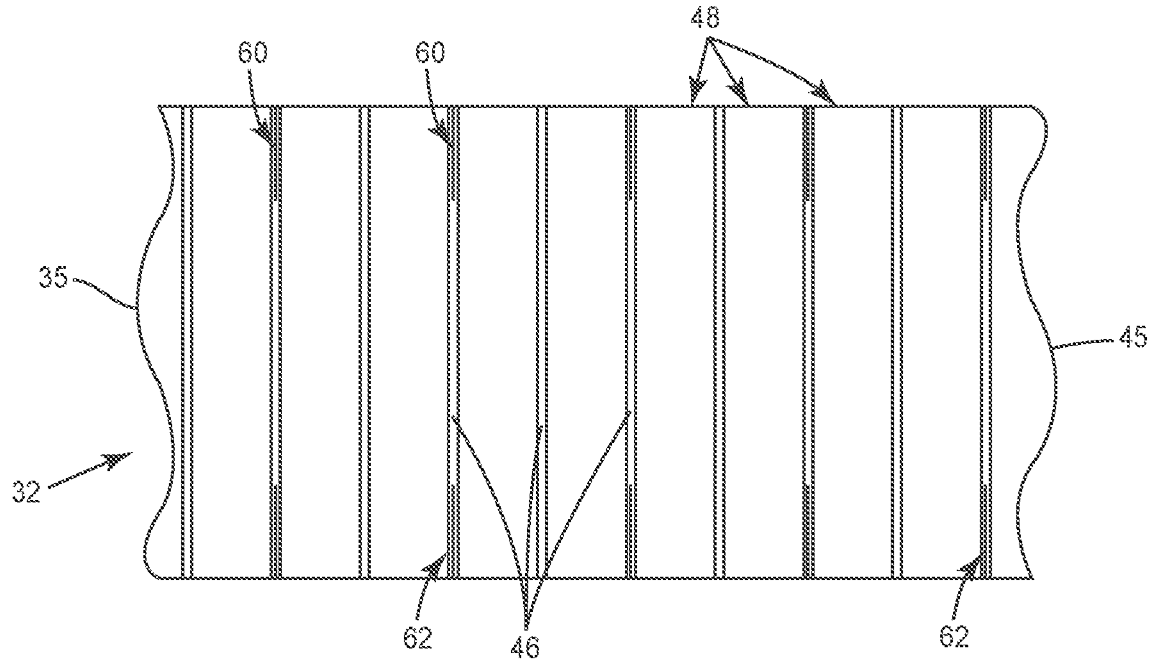
FIG. 12 is a side view of a portion of one embodiment of a component of the spring assembly shown in FIG. 1.

In one embodiment, shown in FIG. 12, string 32 includes slits 60, 62 in every other vertical seam 46 and the vertical seams 46 between the vertical seams 46 that include slits 60, 62 do not include slits 60, 62. That is, each vertical seam 46 includes either no slits 60, 62 or both slit 60 and slit 62. Slit 60 in one vertical seam 46 is parallel and/or coaxial with slit 62 in the same vertical seam 46.

Figure 13:
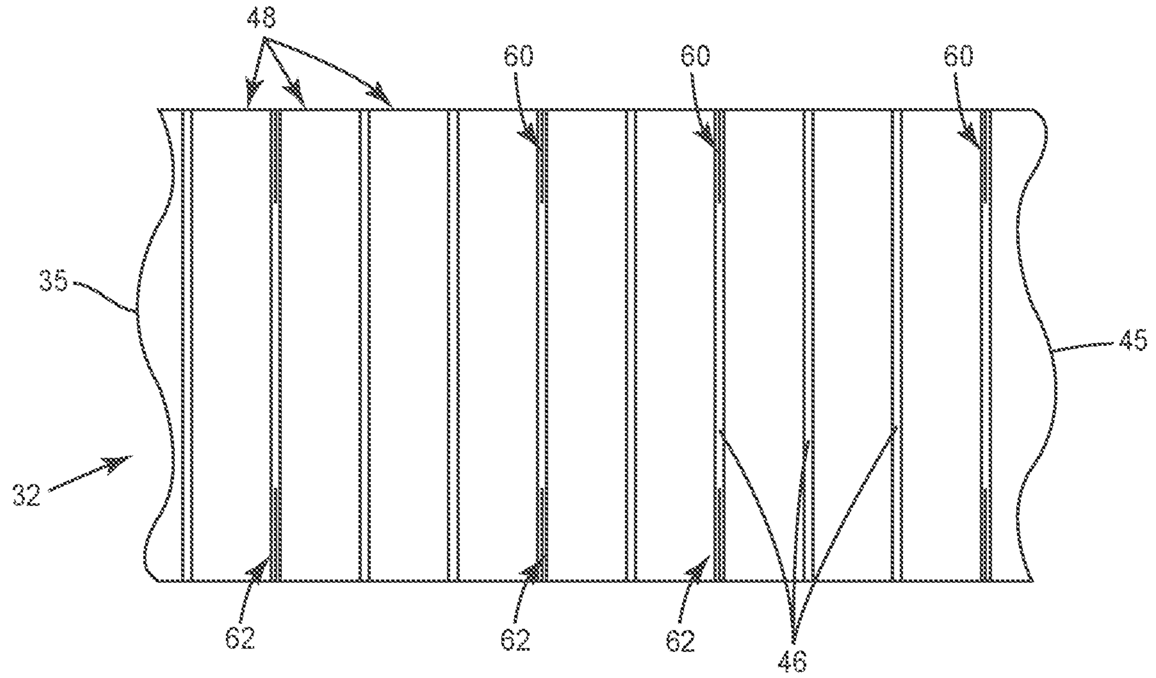
FIG. 13 is a side view of a portion of one embodiment of a component of the spring assembly shown in FIG. 1.

In one embodiment, shown in FIG. 13, string 32 includes slits 60, 62 in every third vertical seam 46 and the vertical seams 46 between the vertical seams 46 that include slits 60, 62 do not include slits 60, 62. That is, each vertical seam 46 includes either no slits 60, 62 or both slit 60 and slit 62. Slit 60 in one vertical seam 46 is parallel and/or coaxial with slit 62 in the same vertical seam 46.

Figure 14:
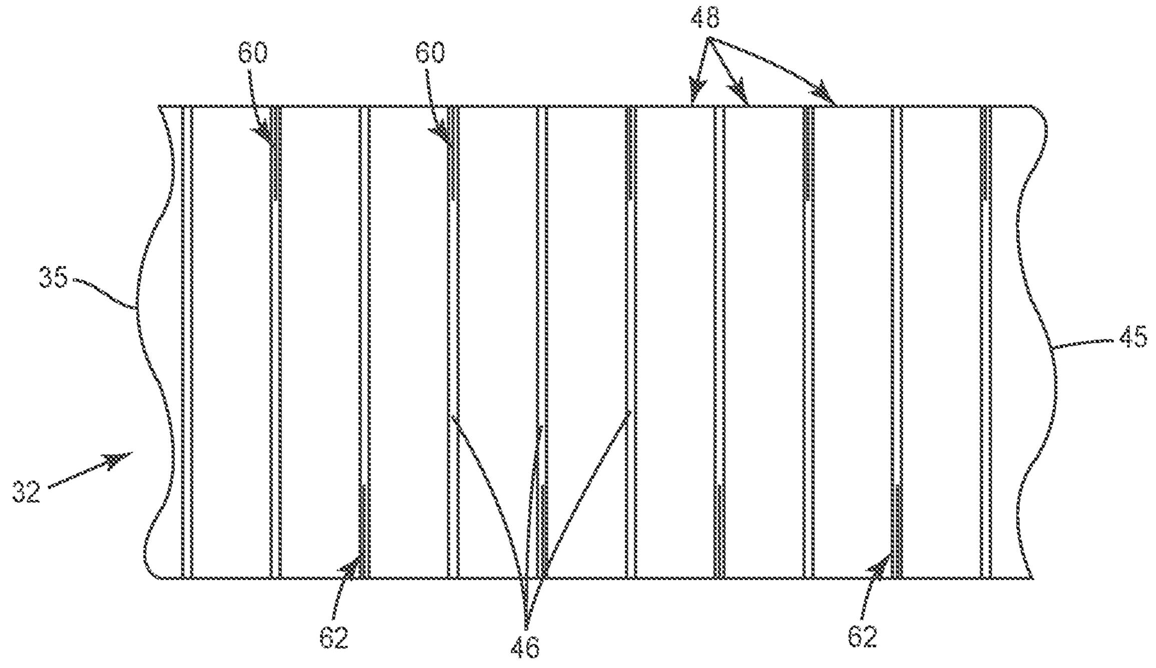
FIG. 14 is a side view of a portion of one embodiment of a component of the spring assembly shown in FIG. 1.

In one embodiment, shown in FIG. 14, string 32 includes slits 60 in every other vertical seam 46 and slits 62 in every other vertical seam 46, wherein the vertical seams 46 that include a slit 60 do not include a slit 62 and the vertical seams 46 that include a slit 62 do not include a slit 60.

Pockets 48 each include at least one spring 64 positioned therein. In some embodiments, springs 64 each have the same configuration. In some embodiments, at least one of springs 64 has a configuration that is different than another one of springs 64. For example, at least one of springs 64 may be more rigid than another one of springs 64. In some embodiments, each of pockets 48 includes only one spring 64 positioned therein. In some embodiments, each of pockets 48 includes more than one spring 64 positioned therein. In some embodiments, each of pockets 48 includes two springs 64 positioned therein, wherein the springs one of the springs is positioned within the other spring in a nested configuration. In some embodiments, at least one of pockets 48 includes only one spring 64 positioned therein and at least one of pockets 48 includes a plurality of springs 64 positioned therein. In some embodiments, the pockets 48 that include one spring 64 alternate with the pockets 48 that include more than one spring 64 such that every other pocket 48 includes only one spring 64 and every other pocket 48 includes more than one spring 64.

In some embodiments, spring assembly 30 consists only of strings 32. In some embodiment, spring assembly 30 comprises strings 32 and one or a plurality of second strings, such as, for example, strings 66, as shown in FIGS. 15-20. Strings 66 each include a first ply of fabric and a second ply of fabric, similar to plies 34, 36 of strings 32. In some embodiments, the plies that strings 66 are made from are formed by folding a single piece of material, such as for example, a material similar to material 38. That is, the first ply may be a first end of the material and the second ply may be a second end of the material, wherein the material is folded about a midsection of the material. In some embodiments, the material is arranged such that the midsection forms a top surface 66*a* of string 66 and the plies are joined at an opposite bottom surface 66*b* of string 66. It is envisioned that this configuration may be reversed such that the midsection forms the bottom surface of string 66 and the plies are joined at the top surface of string 66. Top and bottom surfaces 66a, 66*b* each extend from end 68 to end 70. In some embodiment, the material can comprise acrylic, acetate, cotton, linen, silk, polyester, wool, nylon, rayon, spandex, lycra, hemp, manmade materials, natural materials (e.g., hemp) and blends and/or combinations thereof Strings 66 each extend along a longitudinal axis L1 between opposite ends 68, 70 of strings 66, as shown in FIG. 16. The plies are joined together at spaced apart portions of the material by vertical seams 72 to define a plurality of pockets 74 along longitudinal axis L1. Vertical seams 72 define opposite end surfaces of string 66. In some embodiment, strings 66 each include the same number of pockets 74. In some embodiment, strings 66 each include different numbers of pockets 74. It is envisioned that strings 66 may each include any number of pockets 74. In some embodiments, strings 66 each include between about 2 and about 40 pockets 74. In some embodiments, strings 66 each include about 3 pockets 74, about 4 pockets 74, about 5 pockets 74, about 6 pockets 74, about 7 pockets 74, about 8 pockets 74, about 9 pockets 74, about 10 pockets 74, about 11 pockets 74, about 12 pockets 74, about 13 pockets 74, about 14 pockets 74, about 15 pockets 74, about 16 pockets 74, about 17 pockets 74, about 18 pockets 74, about 19 pockets 74, about 20 pockets 74, about 21 pockets 74, about 22 pockets 74, about 23 pockets 74, about 24 pockets 74, about 25 pockets 74, about 26 pockets 74, about 27 pockets 74, about 28 pockets 74, about 29 pockets 74, about 30 pockets 74, about 31 pockets 74, about 32 pockets 74, about 33 pockets 74, about 34 pockets 74, about 35 pockets 74, about 36 pockets 74, about 37 pockets 74, about 38 pockets 74, or about 39 pockets 74. In some embodiments, strings 32 each include the same number of pockets 48 as strings 66 include pockets 74. That is, the number of pockets 48 in each of strings 32 is the same as the number of pockets 74 in each of strings 66.

In some embodiments, vertical seams 72 are evenly spaced apart from one another along longitudinal axis L1 such that each of pockets 74 has the same width, the width of each of pockets 74 being defined by the distance from one of vertical seams 72 to an adjacent one of vertical seams 72. In some embodiments, vertical seams 72 are not evenly spaced apart from one another along longitudinal axis L1 such that at least one of pockets 74 have a width that is different than a width another one of other pockets 74, the widths of pockets 74 being defined by the distance from one of vertical seams 72 to an adjacent one of vertical seams 72. Vertical seams 74 each have a length defined by the distance from the top surface of string 66 to the bottom surface of string 66. In some embodiments, vertical seams 72 each have the same length. In some embodiments, the length of at least one of vertical seams 72 is different than the length of at least another one of vertical seams 72.

In some embodiments, vertical seams 72 are formed by sewing, adhering, or welding the first ply to the second ply along at least a portion of the length of each vertical seam 72. In some embodiments, vertical seams 46 are formed by a horizontal weld similar to horizontal weld 50. In some embodiments, vertical seams 72 are formed by a vertical weld similar to vertical weld 54.

Pockets 74 each include at least one spring, such as, for example, a spring similar to spring 64 positioned therein. In some embodiments, the springs within pockets 74 each have the same configuration. In some embodiments, at least one of the springs within pockets 74 has a configuration that is different than another one of the springs within pockets 74. For example, at least one of the springs within pockets 74 may be more rigid than another one of the springs within pockets 74. In some embodiments, each of pockets 74 includes only one spring positioned therein. In some embodiments, each of pockets 74 includes more than one spring positioned therein. In some embodiments, each of pockets 74 includes two springs positioned therein, wherein one of the springs one spring is positioned within the other spring in a nested configuration. In some embodiments, at least one of pockets 74 includes only one spring positioned therein and at least one of pockets 74 includes a plurality of springs positioned therein. In some embodiments, the pockets 74 that include one spring alternate with the pockets 74 that include more than one spring such that every other pocket 74 includes only one spring and every other pocket 74 includes more than one spring.

In some embodiments, top surface 66*a* extends continuously from end 68 to end 70. That is, there are no gaps in top surface 66*a* from end 68 to end 70. This is in contrast to strings 32 that include slits 60, 62 in top surface 42 and/or bottom surface 44 between ends 35, 45. Stated another way, strings 32 include slits 60 and/or slits 62 and strings 66 do not include any vertical slits in vertical seams 72. It is envisioned that because strings 66 are free of such vertical slits, that movement between pockets 74 is limited. That is, slits 60, 62 in strings 32 allow greater movement between pockets 48 than is permitted between pockets 74.

In some embodiments, spring assembly 30 comprises a plurality of zones, such as, for example, a zone Z1 and a zone Z2, as shown in FIGS. 15-20. In some embodiments, spring assembly 30 comprises one or a plurality of zones Z1 and one or a plurality of zones Z2. In some embodiments, zone Z1 includes strings 32 and zone Z2 includes strings 66. That is, zone Z1 includes one or a plurality of strings 32 and zone Z2 includes one or a plurality of strings 66. It is envisioned that zones Z1, Z2 may be selectively positioned in spring assembly 30 such that zones Z1 are positioned at areas of mattress 30*a* where greater movement between pockets 48 is desired and that zones Z2 are positioned at areas of mattress 30*a* wherein less movement between pockets 74 is desired.

Figure 15:
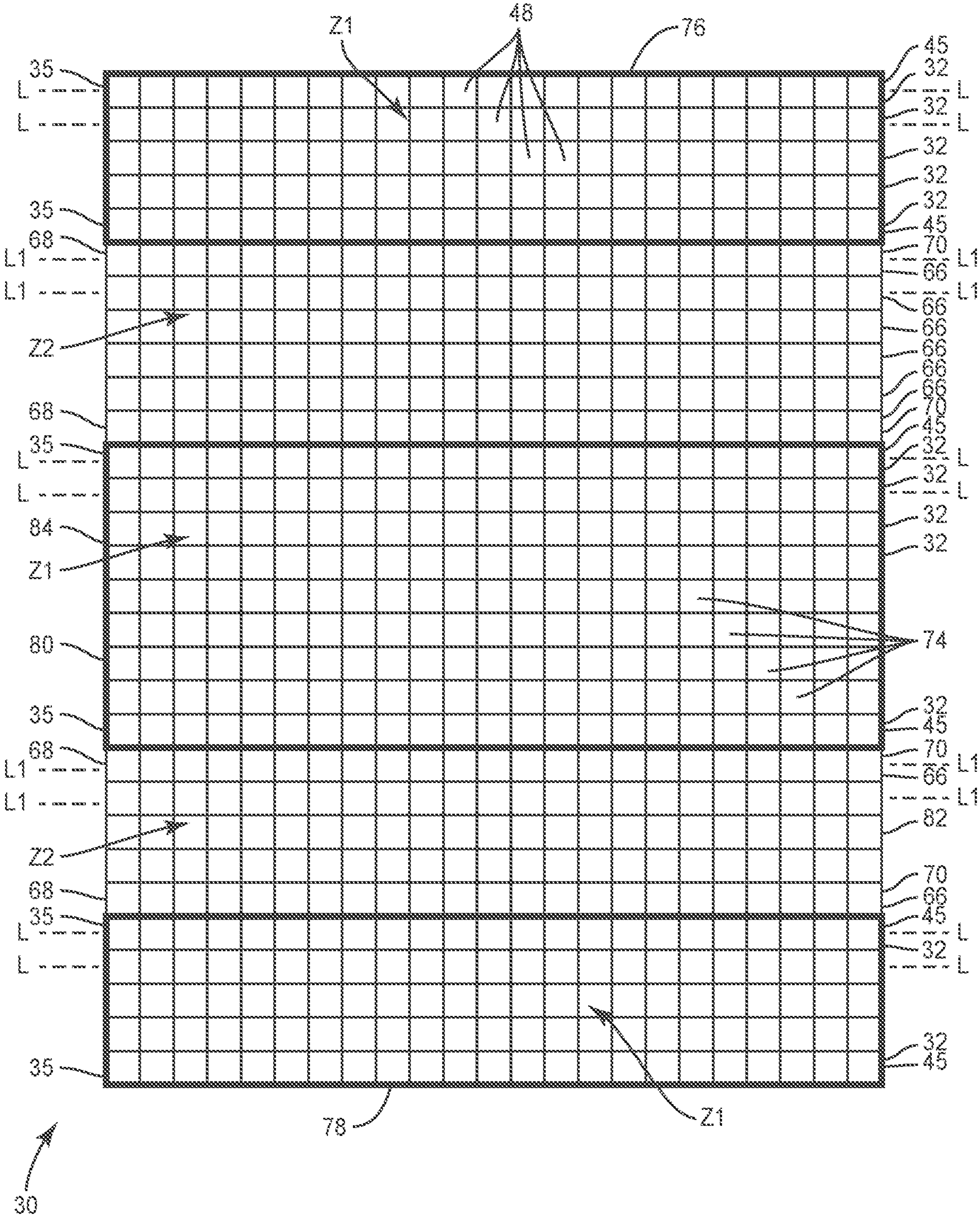
FIG. 15 is a top view of one embodiment of a spring assembly in accordance with the principles of the present disclosure.
Figure 16:
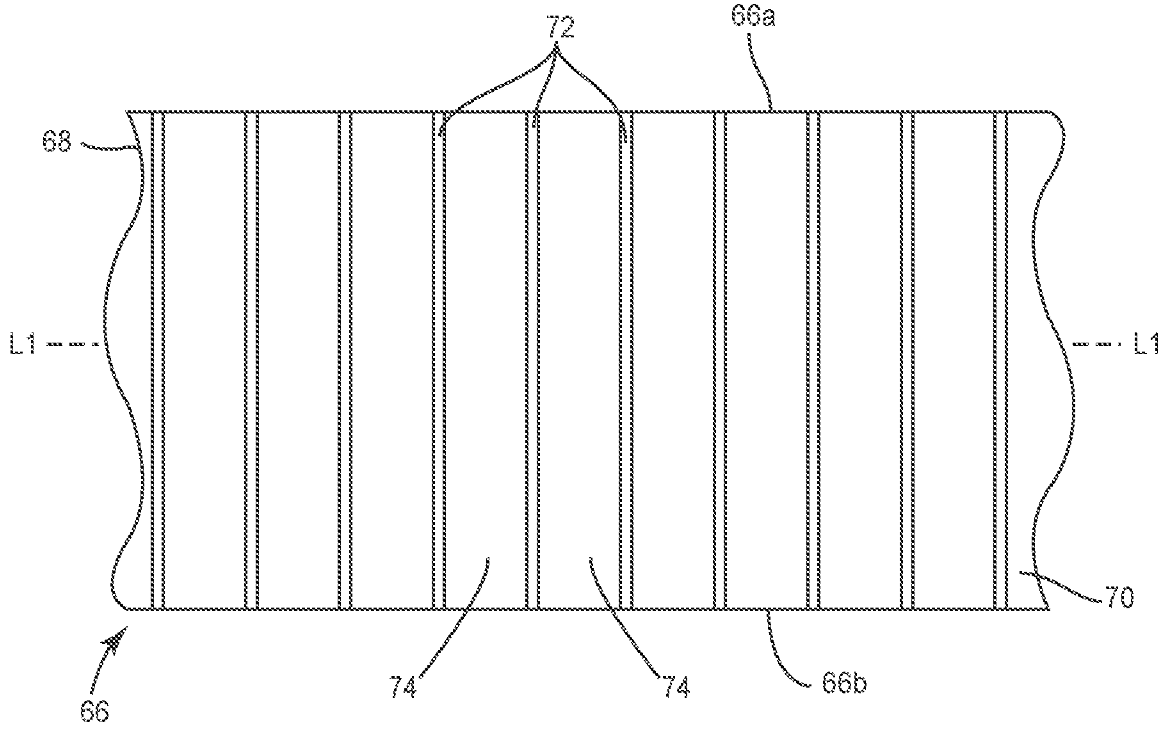
FIG. 16 is a side view of a portion of one embodiment of a component of the spring assembly shown in FIG. 15.

In one embodiment, shown in FIG. 15, spring assembly 30 comprises zones Z1 at a top end 76 of spring assembly 30 and at an opposite bottom end 78 of spring assembly 30. Zone Z1 at end 76 extends along and/or defines an end surface of end 76 and zone Z1 at end 78 extends along and/or defines an end surface of end 78. Zones Z1 at ends 76, 78 each extend continuously from a side 80 of spring assembly 30 to an opposite side 82 of spring assembly 30. Spring assembly 30 includes an additional zone Z1 at a midsection 84 of spring assembly 30 such that zone Z1 at midsection 84 is positioned between zones Z1 at ends 76, 78. Midsection 84 is positioned between ends 76, 78 and extends from side 80 to side 82. Zone Z1 at midsection 84 extends from side 80 to side 82. Zone Z1 at end 76 is spaced apart from zone Z1 at midsection 84 by a zone Z2 and zone Z1 at end 78 is spaced apart from zone Z1 at midsection 84 by a zone Z2. In some embodiments, zones Z1 at ends 76, 78 are equally spaced apart from zone Z1 at midsection 84. In some embodiments, zones Z2 each extend continuously from side 80 to side 82.

In some embodiments, end 76 is configured to be positioned at a head of mattress 30*a* and end 78 is configured to be positioned at a foot of mattress 30*a*. As such, zone Z1 at end 76 is configured to support a sleeper's head, zone Z2 is configured to support the sleeper's legs and/or feet and zone Z1 at midsection 82 is configured to support the sleeper's midsection or torso. It is envisioned that lengths of zones Z1 between ends 76, 78 can be selectively adjusted such that each of zones Z1 supports all or a portion of the sleeper's head, the sleeper's legs and/or the sleeper's feet and midsection or torso, respectively.

In some embodiments, zones Z1 at ends 76, 78 of spring assembly 30 shown in FIG. 15 each include the same number of strings 32. In some embodiments, zone Z1 at end 76 of spring assembly 30 shown in FIG. 15 includes more or less strings 32 than zone Z1 at end 78. In some embodiments, zones Z1 of spring assembly 30 shown in FIG. 15 each include the same number of strings 32. In some embodiments, zone Z1 at midsection 84 of spring assembly 30 shown in FIG. 15 includes more strings 32 than zones Z1 at ends 76, 78. In some embodiments, zone Z1 at midsection 84 of spring assembly 30 shown in FIG. 15 includes fewer strings 32 than zones Z1 at ends 76, 78. In some embodiments, zones Z2 at ends 76, 78 of spring assembly 30 shown in FIG. 15 each include the same number of strings 66. In some embodiments, zone Z2 at end 76 of spring assembly 30 shown in FIG. 15 includes more or less strings 66 than zone Z2 at end 78.

Figure 17:
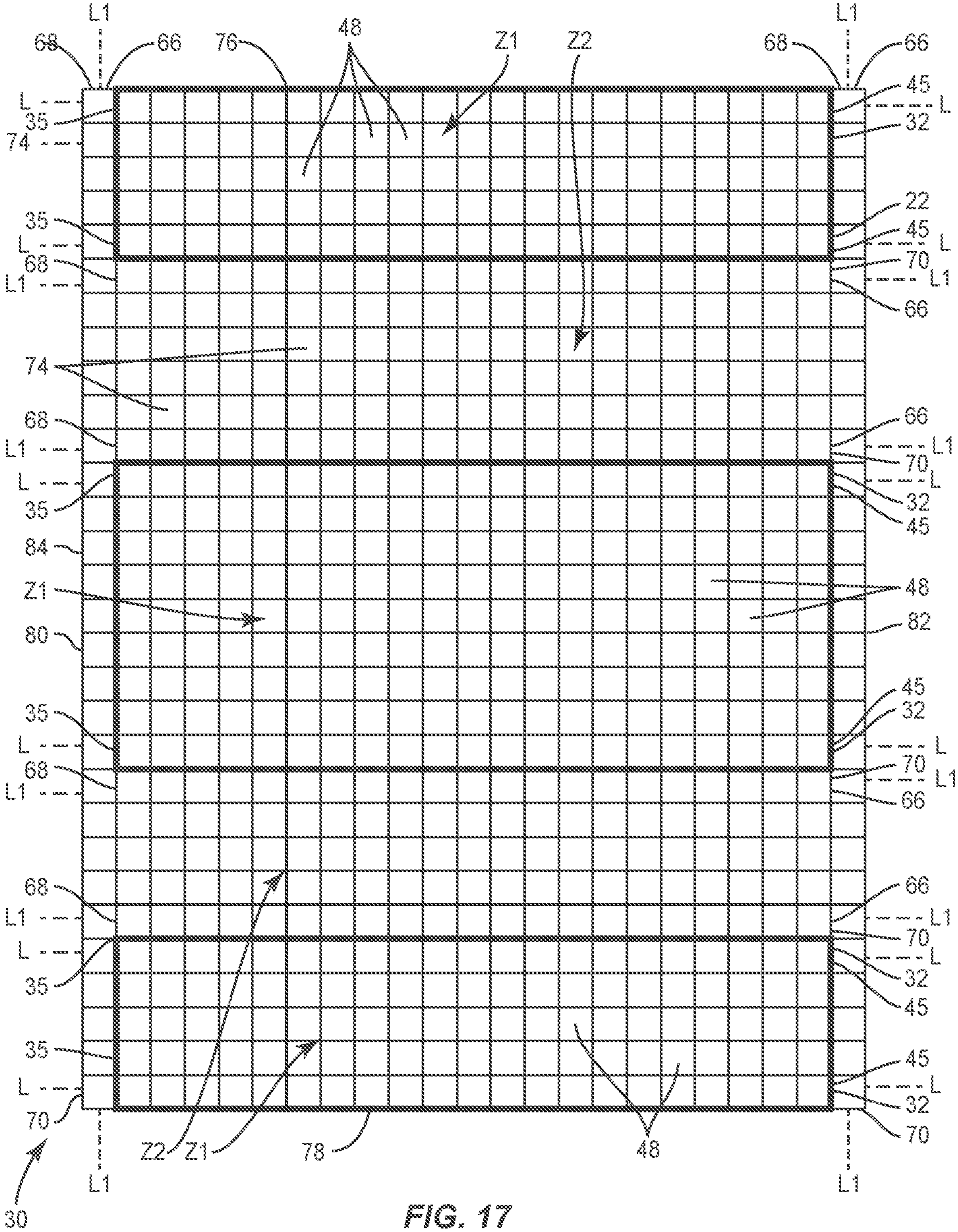
FIG. 17 is a top view of one embodiment of a spring assembly in accordance with the principles of the present disclosure.

In one embodiment, shown in FIG. 17, spring assembly 30 comprises zones Z1 at end 76 of spring assembly 30 and at end 78 of spring assembly 30. Zone Z1 at end 76 extends along and/or defines a portion of the end surface of end 76 and zone Z1 at end 78 extends along and/or defines a portion of the end surface of end 78. Spring assembly 30 includes an additional zone Z1 at midsection 84 such that zone Z1 at midsection 84 is positioned between zones Z1 at ends 76, 78. Zone Z1 at end 76 is spaced apart from zone Z1 at midsection 84 by a zone Z2 and zone Z1 at end 78 is spaced apart from zone Z1 at midsection 84 by a zone Z2. Zones Z1, Z2 are each positioned between one or a plurality of strings 66 that each extend continuously from the end surface of end 76 to the end surface of end 78. That is, zones Z1, Z2 are each spaced inwardly from side surfaces of sides 80, 82 by strings 66. In some embodiments, zones Z1 at ends 76, 78 are equally spaced apart from zone Z1 at midsection 84.

In some embodiments, zones Z1 at ends 76, 78 of spring assembly 30 shown in FIG. 17 each include the same number of strings 32. In some embodiments, zone Z1 at end 76 of spring assembly 30 shown in FIG. 17 includes more or less strings 32 than zone Z1 at end 78. In some embodiments, zones Z1 of spring assembly 30 shown in FIG. 17 each include the same number of strings 32. In some embodiments, zone Z1 at midsection 84 of spring assembly 30 shown in FIG. 17 includes more strings 32 than zones Z1 at ends 76, 78. In some embodiments, zone Z1 at midsection 84 of spring assembly 30 shown in FIG. 17 includes less strings 32 than zones Z1 at ends 76, 78. In some embodiments, zones Z2 at ends 76, 78 of spring assembly 30 shown in FIG. 17 each include the same number of strings 66. In some embodiments, zone Z2 at end 76 of spring assembly 30 shown in FIG. 17 includes more or less strings 66 than zone Z2 at end 78.

Figure 18:
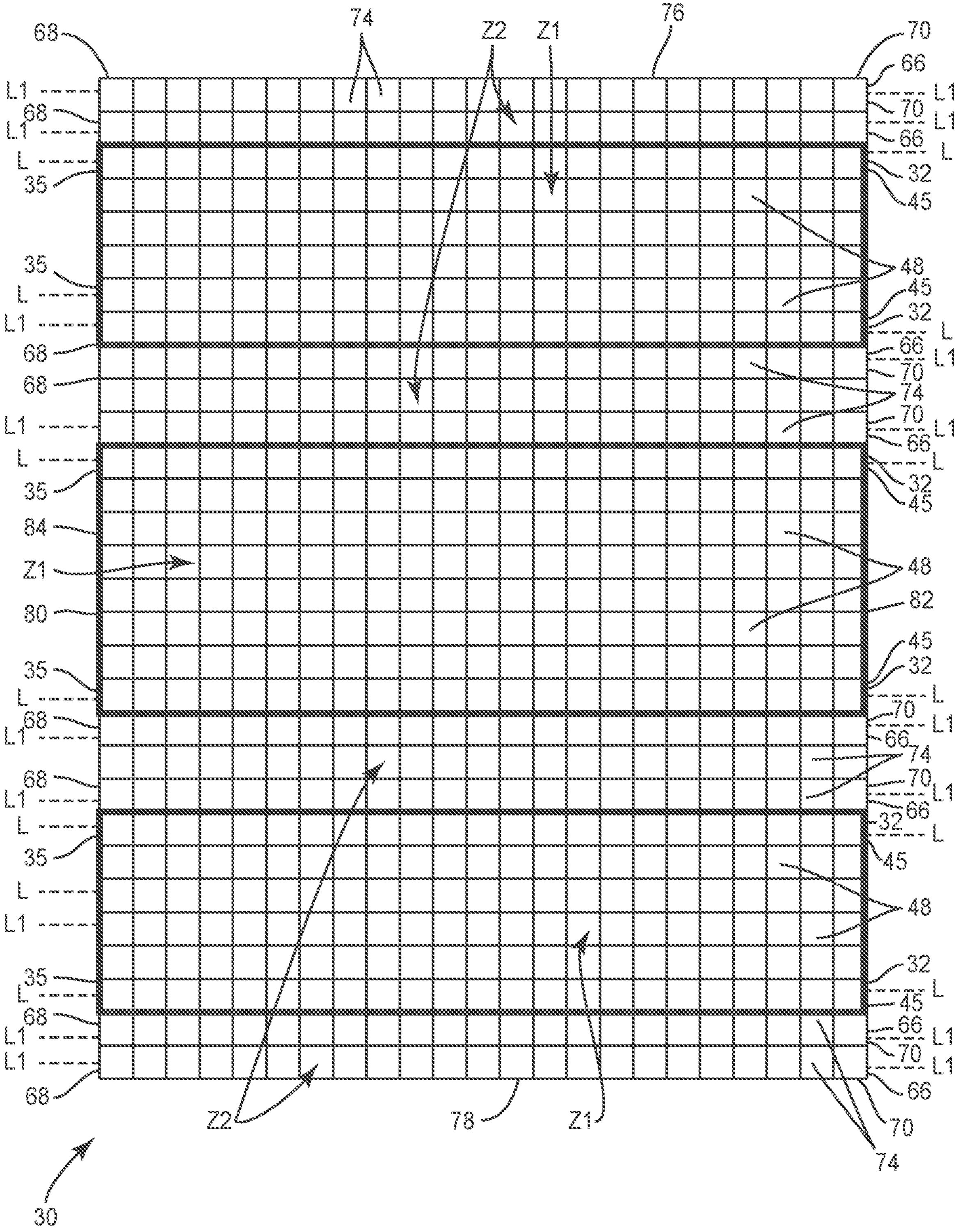
FIG. 18 is a top view of one embodiment of a spring assembly in accordance with the principles of the present disclosure.

In one embodiment, shown in FIG. 18, spring assembly 30 comprises zones Z1 at end 76 of spring assembly 30 and at end 78 of spring assembly 30. Zone Z1 at end 76 is spaced apart from the end surface of end 76 by a zone Z2 that extends along and/or defines the end surface of end 76 and zone Z1 at end 78 is spaced apart from the end surface of end 78 by a zone Z2 that extends along and/or defines the end surface of end 78. Spring assembly 30 includes an additional zone Z1 at midsection 84 such that zone Z1 at midsection 84 is positioned between zones Z1 at ends 76, 78. Zone Z1 at end 76 is spaced apart from zone Z1 at midsection 84 by a zone Z2 and zone Z1 at end 78 is spaced apart from zone Z1 at midsection 84 by a zone Z2. In some embodiments, zones Z1 at ends 76, 78 are equally spaced apart from zone Z1 at midsection 84.

In some embodiments, zones Z1 at ends 76, 78 of spring assembly 30 shown in FIG. 18 each include the same number of strings 32. In some embodiments, zone Z1 at end 76 of spring assembly 30 shown in FIG. 18 includes more or less strings 32 than zone Z1 at end 78. In some embodiments, zones Z1 of spring assembly 30 shown in FIG. 18 each include the same number of strings 32. In some embodiments, zone Z1 at midsection 84 of spring assembly 30 shown in FIG. 18 includes more strings 32 than zones Z1 at ends 76, 78. In some embodiments, zone Z1 at midsection 84 of spring assembly 30 shown in FIG. 18 includes less strings 32 than zones Z1 at ends 76, 78. In some embodiments, zones Z2 that extend along and/or define the end surfaces of ends 76, 78 of spring assembly 30 shown in FIG. 18 each include the same number of strings 66. In some embodiments, zone Z2 that extends along and/or defines the end surface of end 76 of spring assembly 30 shown in FIG. 18 includes more or less strings 66 than zone Z2 that extends along and/or defines the end surface at end 78. In some embodiments, zones Z2 that are positioned between zone Z1 at end 76 and zone Z1 at midsection 84 and between zone Z1 at end 76 and zone Z1 at midsection 84 each include the same number of strings 66. In some embodiments, zone Z2 positioned between zones Z1 at end 76 and midsection 84 includes more or less strings 66 than zone Z2 positioned between zone Z1 at end 76 and zone Z1 at midsection 84. In some embodiments, zones Z2 that are positioned between zone Z1 at end 76 and zone Z1 at midsection 84 and between zone Z1 at end 76 and zone Z1 at midsection 84 each include the same number of strings 66 as zones Z2 that extend along and/or define the end surfaces of ends 76, 78. In some embodiments, at least one of zones Z2 that are positioned between zone Z1 at end 76 and zone Z1 at midsection 84 and between zone Z1 at end 76 and zone Z1 at midsection 84 includes more of less strings 66 than at least one of zones Z2 that extend along and/or define the end surfaces of ends 76, 78.

Figure 19:
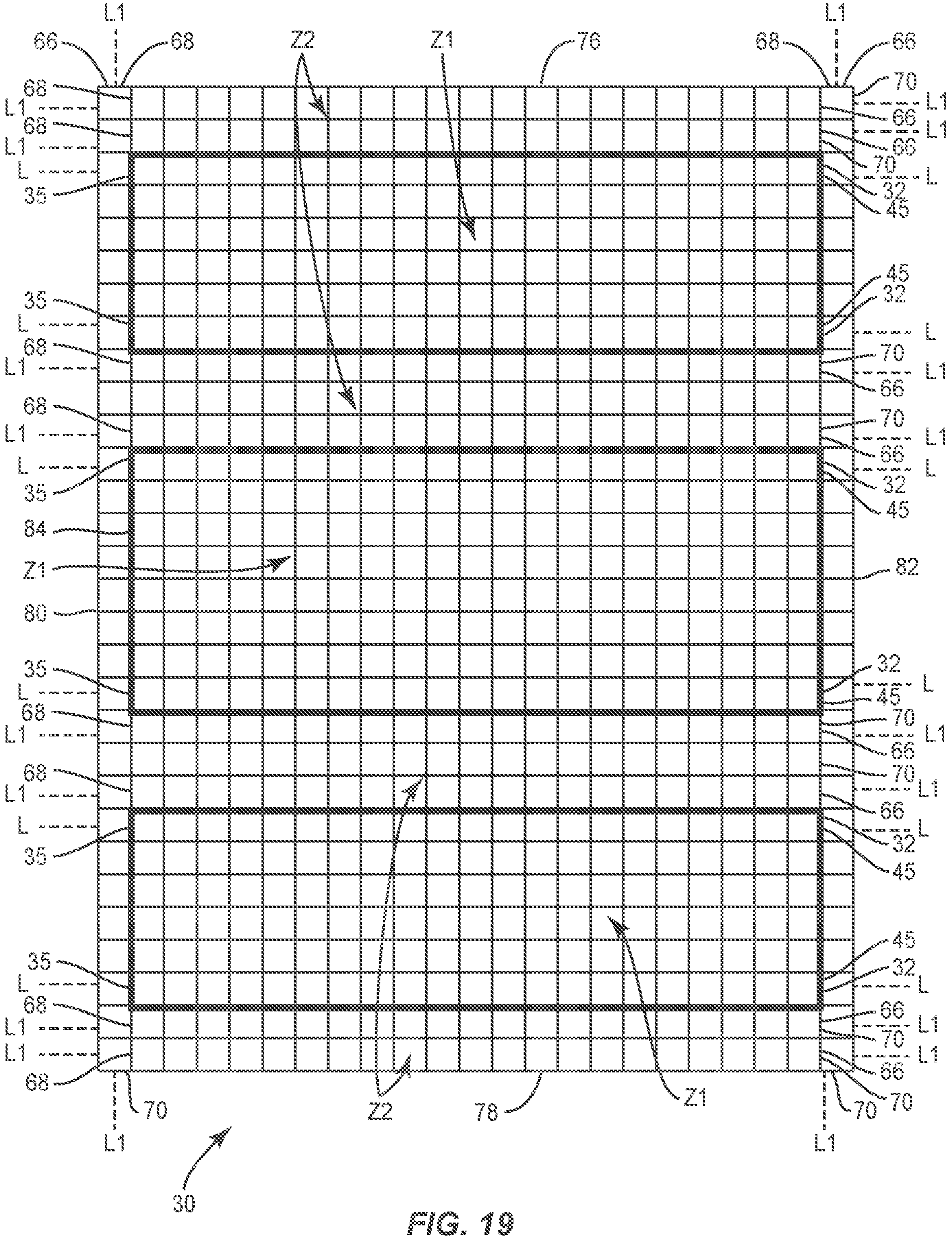
FIG. 19 is a top view of one embodiment of a spring assembly in accordance with the principles of the present disclosure.

In one embodiment, shown in FIG. 19, spring assembly 30 comprises zones Z1 at end 76 of spring assembly 30 and at end 78 of spring assembly 30. Zone Z1 at end 76 is spaced apart from the end surface of end 76 by a zone Z2 that extends along and/or defines a portion of the end surface of end 76 and zone Z1 at end 78 is spaced apart from the end surface of end 78 by a zone Z2 that extends along and/or defines a portion of the end surface of end 78. Spring assembly 30 includes an additional zone Z1 at midsection 84 such that zone Z1 at midsection 84 is positioned between zones Z1 at ends 76, 78. Zone Z1 at end 76 is spaced apart from zone Z1 at midsection 84 by a zone Z2 and zone Z1 at end 78 is spaced apart from zone Z1 at midsection 84 by a zone Z2. Zones Z1, Z2 are each positioned between one or a plurality of strings 66 that each extend continuously from the end surface of end 76 to the end surface of end 78. That is, zones Z1, Z2 are each spaced inwardly from the side surfaces of sides 80, 82 by strings 66. In some embodiments, zones Z1 at ends 76, 78 are equally spaced apart from zone Z1 at midsection 84.

In some embodiments, zones Z1 at ends 76, 78 of spring assembly 30 shown in FIG. 19 each include the same number of strings 32. In some embodiments, zone Z1 at end 76 of spring assembly 30 shown in FIG. 19 includes more or less strings 32 than zone Z1 at end 78. In some embodiments, zones Z1 of spring assembly 30 shown in FIG. 19 each include the same number of strings 32. In some embodiments, zone Z1 at midsection 84 of spring assembly 30 shown in FIG. 19 includes more strings 32 than zones Z1 at ends 76, 78. In some embodiments, zone Z1 at midsection 84 of spring assembly 30 shown in FIG. 19 includes less strings 32 than zones Z1 at ends 76, 78. In some embodiments, zones Z2 that extend along and/or define the end surfaces of ends 76, 78 of spring assembly 30 shown in FIG. 19 each include the same number of strings 66. In some embodiments, zone Z2 that extends along and/or defines the end surface of end 76 of spring assembly 30 shown in FIG. 19 includes more or less strings 66 than zone Z2 that extends along and/or defines the end surface at end 78. In some embodiments, zones Z2 that are positioned between zone Z1 at end 76 and zone Z1 at midsection 84 and between zone Z1 at end 76 and zone Z1 at midsection 84 each include the same number of strings 66. In some embodiments, zone Z2 positioned between zones Z1 at end 76 and midsection 84 includes more or less strings 66 than zone Z2 positioned between zone Z1 at end 76 and zone Z1 at midsection 84. In some embodiments, zones Z2 that are positioned between zone Z1 at end 76 and zone Z1 at midsection 84 and between zone Z1 at end 76 and zone Z1 at midsection 84 each include the same number of strings 66 as zones Z2 that extend along and/or define the end surfaces of ends 76, 78. In some embodiments, at least one of zones Z2 that are positioned between zone Z1 at end 76 and zone Z1 at midsection 84 and between zone Z1 at end 76 and zone Z1 at midsection 84 includes more of less strings 66 than at least one of zones Z2 that extend along and/or define the end surfaces of ends 76, 78.

Figure 20:
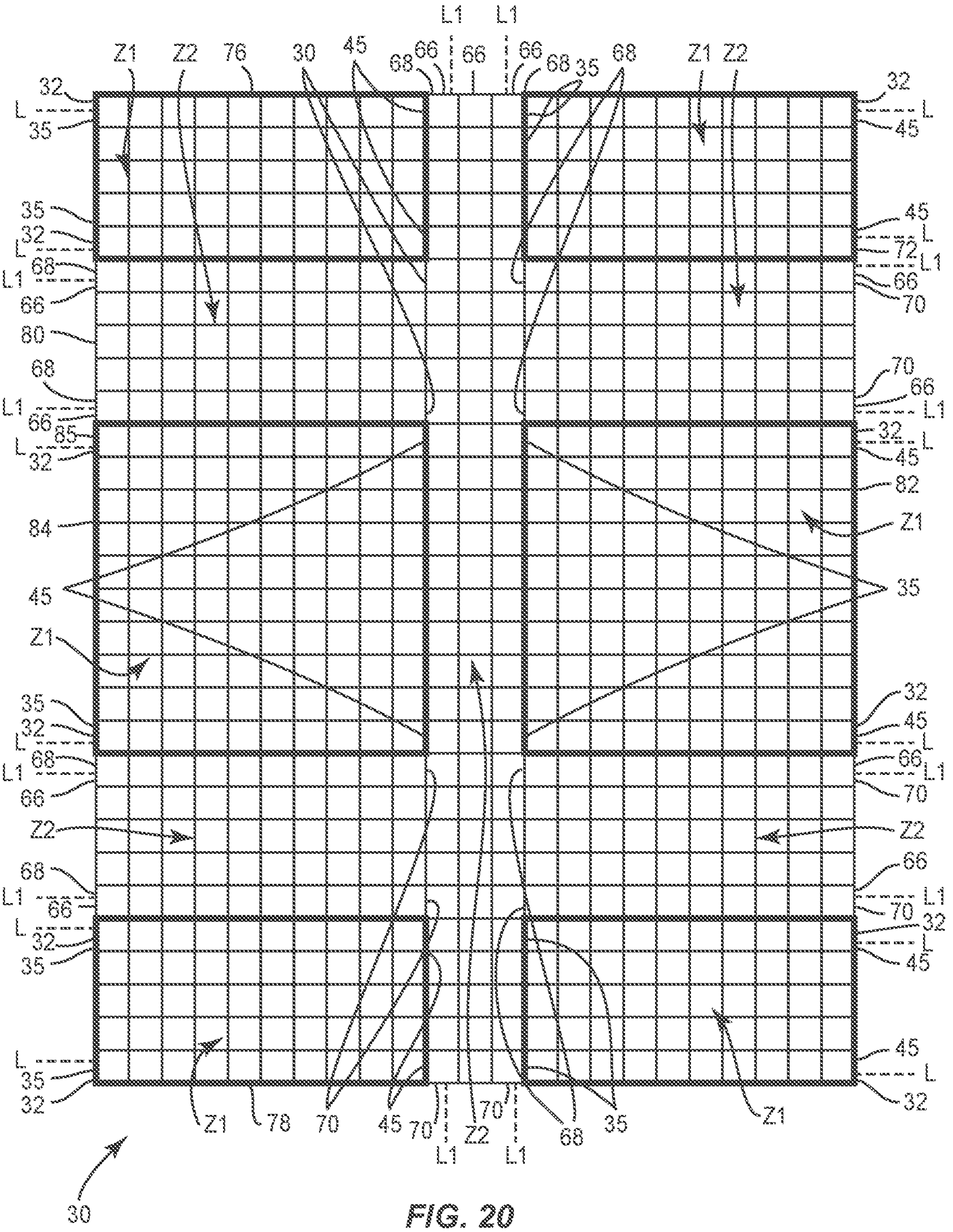
FIG. 20 is a top view of one embodiment of a spring assembly in accordance with the principles of the present disclosure; a FIG. 21 is a top view of one embodiment of components of a mattress in accordance with the principles of the present disclosure, with part separated.

In one embodiment, shown in FIG. 20, spring assembly 30 comprises two spaced apart zones Z1 at end 76 of spring assembly 30 and two spaced apart zones Z1 at end 78 of spring assembly 30. Zones Z1 at end 76 extend along and/or define a portion of the end surface of end 76 and zones Z1 at end 78 extend along and/or define a portion of the end surface of end 78. Zones Z1 at end 76 are spaced apart from one another by a zone Z2 that extends continuously from the end surface of end 76 to the end surface of end 78. Zones Z1 at end 78 are spaced apart by the same zone Z2 that spaces zones Z1 at end 76 apart. The zone Z2 that spaces zones Z1 at end 76 apart and zones Z1 at end 78 apart includes one or a plurality of strings 66. Spring assembly 30 includes spaced apart zones Z1 at midsection 84 such that zones Z1 at midsection 84 are positioned between zones Z1 at end 76 and zones Z1 at end 78. The zone Z2 that spaces zones Z1 at end 76 apart and zones Z1 at end 78 apart also spaces zones Z1 at midsection 84 apart.

Zones Z1 at end 76 are each spaced apart from zones Z1 at midsection 84 by a zone Z2. Zones Z2 that space zones Z1 at end 76 apart from zones Z1 at midsection 84 are spaced apart by the zone Z2 that spaces zones Z1 at end 76 apart, spaces zones Z1 at end 76 apart and spaces zones Z1 at midsection 84 apart. Zones Z1 at end 78 are each spaced apart from zones Z1 at midsection 84 by a zone Z2. Zones Z2 that space zones Z1 at end 78 apart from zones Z1 at midsection 84 are spaced apart by the zone Z2 that spaces zones Z1 at end 76 apart, spaces zones Z1 at end 78 apart and spaces zones Z1 at midsection 84 apart.

As shown in FIG. 20, spring assembly 30 comprises zones Z1 adjacent side 80 at end 76, end 78 and midsection 84 that are spaced apart from one another and zones Z1 adjacent side 82 at end 76, end 78 and midsection 84 that are spaced apart from one another. Zones Z1 adjacent side 80 may be configured to accommodate the head, the legs and/or feet and the torso or midsection, respectively, of a first sleeper and that zones Z1 adjacent side 82 may be configured to accommodate the head, the legs and/or feet and the torso or midsection, respectively, of a second sleeper. It is envisioned that the zone Z2 that spaces zones Z1 at end 76 apart, spaces zones Z1 at end 78 apart and spaces zones Z1 at midsection 84 apart will reduce or eliminate movement of at least one of zones Z1 adjacent side 82 when there is movement within at least one of zones Z1 adjacent side 80. Likewise, the zone Z2 that spaces zones Z1 at end 76 apart, spaces zones Z1 at end 78 apart and spaces zones Z1 at midsection 84 apart will reduce or eliminate movement of at least one of zones Z1 adjacent side 80 when there is movement within at least one of zones Z1 adjacent side 82. As such, spring assembly 30 may be configured to reduce or eliminate movement on one side of spring assembly 30 when a sleeper on an opposite side of spring assembly 30 moves.

In some embodiments, wherein the first and second sleepers each have the same preference as to mattress firmness, for example, zone Z1 at end 76 adjacent side 80 has the same configuration as zone Z1 at end 76 adjacent side 82 and/or zone Z1 at end 78 adjacent side 80 has the same configuration as zone Z1 at end 78 adjacent side 82 and/or zone Z1 at midsection 84 adjacent side 80 has the same configuration as zone Z1 at midsection 84 adjacent side 82. When zones Z1 at ends 76, 78 and midsection 84 are the same, mattress 30*a* may be flipped by rotating mattress 30*a* 180 degrees along an axis that extends from end 76 to end 78. That is, mattress 30*a* is rotated side over side. Since zones Z1 at ends 76, 78 and midsection 84 are the side adjacent side 80 and adjacent side 82, the sleepers will still sleep on top of zones Z1 that have the same configuration as they did before mattress 30*a* was flipped.

In some embodiments, at least one of zones Z1 adjacent side 80 is different than at least one of zones Z1 adjacent side 82. This allows spring assembly 30 to be customized to suit the preferences of the first and second sleepers. For example, if the sleeper that sleeps adjacent side 80 desires a firmer mattress than the sleeper that sleeps adjacent side 82, at least one of zones Z1 adjacent side 80 may be firmer than at least one of zones Z1 adjacent side 82. In some embodiments, the firmness (or softness) of zones Z1 may be altered by changing the material springs 64 or made from a harder or more rigid material to a softer or less rigid material, for example. In some embodiments, the firmness (or softness) of zones Z1 may be altered by changing the number of springs 64 within pockets 48 and/or changing the configuration of springs 64. For example, where a firmer mattress is desired, pockets 48 can each include more than one spring 64 therein. In some embodiments, the firmness (or softness) of zones Z1 may be altered by changing the depth and/or width of slits 60 and/or slits 62, as discussed herein. Indeed, because there may be a direct correlation between the depth and/or width of slits 60, 62 and the amount of movement between pockets 48, it is envisioned that increasing the depth and/or width of slits 60 and/or slits 62 may allow greater movement between pockets 48, thus resulting in a less firm feel, for example.

In embodiments wherein zones Z1 at ends 76, 78 adjacent side 80 are the same and zones Z1 at ends 76, 78 adjacent side 82 are the same, to maintain the configuration that the sleeper that sleeps adjacent side 80 prefers and that the sleeper that sleeps adjacent side 82 prefers, the depth and/or width slits 60 in a given one of the zones Z1 at ends 76, 78 should be the same as the depth and/or width of slits 60 in that zone Z1. Mattress 30*a* may then be flipped in a manner that maintains the preferences of the sleepers by rotating mattress 30*a* 180 degrees along an axis that extends perpendicular to an axis that extends from end 76 to end 78. That is, mattress 30*a* is rotated end over end.

In some embodiments, zones Z1 at end 76 of spring assembly 30 shown in FIG. 20 each include the same number of strings 32 and/or zones Z1 at end 78 each include the same number of strings 32. In some embodiments, zones Z1 at end 76 of spring assembly 30 shown in FIG. 15 each include more or less strings 32 than zones Z1 at end 78. In some embodiments, zones Z1 of spring assembly 30 shown in FIG. 15 each include the same number of strings 32. In some embodiments, zones Z1 at midsection 84 of spring assembly 30 shown in FIG. 20 each include more strings 32 than zones Z1 at ends 76, 78. In some embodiments, zones Z1 at midsection 84 of spring assembly 30 shown in FIG. 20 each include less strings 32 than zones Z1 at ends 76, 78. In some embodiments, zones Z2 at ends 76, 78 of spring assembly 30 shown in FIG. 20 each include the same number of strings 66. In some embodiments, zones Z2 at end 76 of spring assembly 30 shown in FIG. 20 include more or less strings 66 than zones Z2 at end 78.

Figure 21:
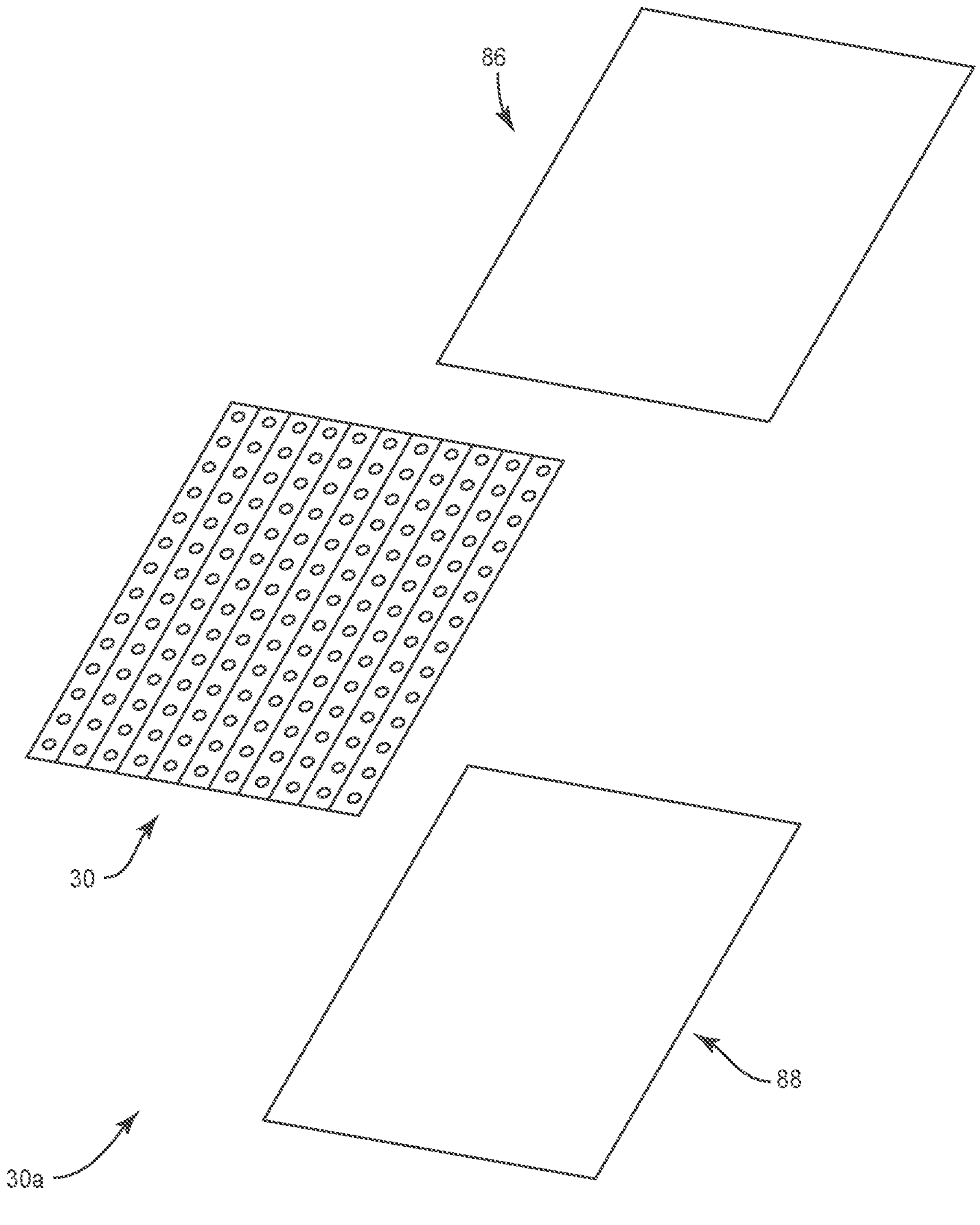
Figure 22:
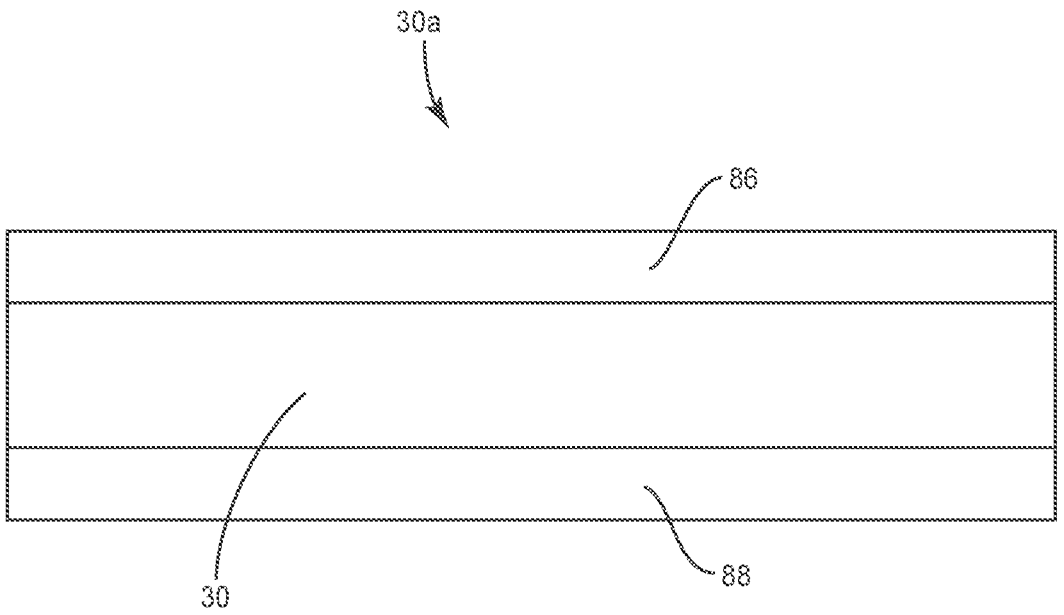
FIG. 22 is a side, cross section view of the mattress shown in FIG. 21.

In some embodiments, shown in FIGS. 21 and 22, mattress 30*a* includes one of spring assemblies 30 discussed herein, a cushioning material 86 and/or a base material 88. As shown in FIG. 22, cushioning material 86 is positioned above spring assembly 30 such that a bottom surface of cushioning material 86 engages the top surfaces of strings 32 and/or strings 66 and base material 88 is positioned below spring assembly 30 such that a top surface of base material 88 engages the bottom surfaces of strings 32 and/or strings 66. That is, spring assembly 30 is positioned between cushioning material 86 and base material 88. In some embodiments, spring assembly 30 is fixed and/or coupled to cushioning material 86 and/or base material 88 by sewing, adhesives, etc.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A spring assembly comprising:

a plurality of first strings of springs; and a plurality of second strings of springs, each of the first strings being joined to at least another one of the first strings or one of the second strings to form the spring assembly such that the spring assembly extends from a first end to an opposite second end, wherein each of the first strings comprises first and second plies of fabric that define a plurality of first and second pockets formed along a length of each of the first strings and each of the second strings defines a plurality of first and second pockets formed along a length of each of the second strings, the pockets of the first strings being formed by vertical seams that join the plies, the vertical seams each including an upper slit that extends through a top surface of a respective one of the first strings and a lower slit that extends through a bottom surface of the respective one of the first strings, the upper and lower slits each having the same length, each of the pockets comprising at least one spring positioned therein, the springs in the pockets of the first strings being different than springs in the second strings, wherein the first pockets of at least one of the first strings and the second strings comprises only one spring positioned therein and the second pockets of at least one of the first strings and the second strings comprises an outer spring and an inner spring positioned therein, the inner spring being positioned within the outer spring in a nested configuration, the second pockets of the first strings alternating with the first pockets of the first strings and the second pockets of the second strings alternating with the first pockets of the second strings, wherein the spring assembly defines a first zone adjacent to the first end, a second zone adjacent to the second end and a third zone between the first and second zones, the third zone having a firmness that is different than a firmness of at least one of the first and second zones, and wherein the upper and lower slits of one of the first strings have different widths.

2. A spring assembly as recited in claim 1, wherein the upper slits are each coaxial with one of the lower slits.

3. A spring assembly as recited in claim 1, wherein each of the upper and lower slits is positioned between columns of vertical welds that define one of the vertical seams.

4. A spring assembly as recited in claim 1, wherein the pockets of the first strings are each formed by two of the vertical seams and a horizontal seam that intersects two of the vertical seams.

5. A spring assembly as recited in claim 1, wherein each of the second strings is joined to at least another one of the second strings or one of the first strings.

6. A spring assembly as recited in claim 1, wherein an inner surface of one of the pockets of a respective one of the first strings is not in communication with an inner surface of an adjacent one of the pockets of the respective one of the first strings.

7. A spring assembly as recited in claim 1, wherein the springs in the first pockets of the first strings are more rigid than the springs in the first pockets of the second strings.

8. A spring assembly as recited in claim 1, wherein the first pockets of the first strings each include only one spring positioned therein and the second pockets of the first strings each include more than one spring positioned therein.

9. A spring assembly as recited in claim 1, wherein the first pockets of the second strings each include only one spring positioned therein and the second pockets of the second strings each include a plurality of springs positioned therein.

10. A spring assembly as recited in claim 1, wherein the first pockets of each of the first strings and the second strings comprises only one spring positioned therein and the second pockets of each of the first strings and the second strings comprises includes a plurality of springs positioned therein.

11. A spring assembly comprising:

a first zone comprising a plurality of first strings of springs; and a second zone comprising a plurality of second strings of springs, each of the first strings being joined to another one of the first strings or one of the second strings to form the spring assembly such that the spring assembly extends from a first end to an opposite second end, wherein the first strings have a first configuration and the second strings have a second configuration that is different than the first configuration, and wherein each of the first strings comprises first and second plies of fabric that define a plurality of first and second pockets formed along a length of each of the first strings by first vertical seams that join the plies, the first vertical seams each including an upper slit that extends through top surfaces of the first strings and a lower slit that extends through bottom surfaces of the first strings, the upper and lower slits each having the same length, each of the second strings defining a plurality of first and second pockets formed along a length of each of the second strings, each of the pockets comprising at least one spring positioned therein, wherein the first pockets of at least one of the first strings and the second strings comprises only one spring positioned therein and second pockets of at least one of the first strings and the second strings comprises an outer spring and an inner spring positioned therein, the inner spring being positioned within the outer spring in a nested configuration, the second pockets of the first strings alternating with the first pockets of the first strings and the second pockets of the second strings alternating with the first pockets of the second strings, wherein the second zone has a firmness that is different than a firmness of the first zone, and wherein the upper and lower slits of one of the first strings have different widths.

12. A spring assembly as recited in claim 11, wherein each of the second strings comprises third and fourth plies of fabric that define the first and second pockets of the second strings, the second strings comprising second vertical seams that join the third and fourth plies, the second vertical seams being free of any slits that extend through top surfaces of the second strings and free of any slits that extend through bottom surfaces of the second strings.

13. A spring assembly as recited in claim 12, wherein each of the first pockets comprises only one spring positioned therein.

14. A spring assembly as recited in claim 12, wherein each of the first pockets comprises only one spring positioned therein and each of the second pockets comprises more than one spring positioned therein.

15. A spring assembly as recited in claim 12, wherein the second zone comprises a plurality of second zones and the first zone comprises a first plurality of first zones that are spaced apart from a second plurality of first zones, the first plurality of first zones being spaced apart from one another and the second plurality of first zones by one of the second zones.

16. A spring assembly as recited in claim 15, wherein the second plurality of first zones are spaced apart from one another and the first plurality of first zones by one of the second zones.

17. A spring assembly as recited in claim 15, wherein the first plurality of first zones is spaced apart from the second plurality of first zones by a single one of the second zones that extends continuously from the first end of the spring assembly to the second end of the spring assembly.

18. A spring assembly comprising:

a plurality of first strings of springs; and a plurality of second strings of springs, each of the first strings being joined to at least another one of the first strings or one of the second strings, wherein each of the first strings comprises first and second plies of fabric that define a plurality of first and second pockets formed along a length of one of the first strings and each of the second strings comprises first and second plies of fabric that define a plurality of first and second pockets formed along a length of one of the second strings, the pockets of the first strings being formed by vertical seams that join the plies of the first strings, the vertical seams each including an upper slit that extends through a top surface of a respective one of the first strings and a lower slit that extends through a bottom surface of the respective one of the first strings, each of the pockets comprising at least one spring positioned therein, the springs in the pockets of the first strings being different than springs in the second strings, wherein the first pockets of at least one of the first strings and the second strings comprises only one spring positioned therein and second pockets of at least one of the first strings and the second strings comprises an outer spring and an inner spring positioned therein, the inner spring being positioned within the outer spring in a nested configuration, the second pockets of the first strings alternating with the first pockets of the first strings and the second pockets of the second strings alternating with the first pockets of the second strings, and wherein the upper and lower slits of one of the first strings have different widths.

19. A spring assembly comprising:

a plurality of first strings each comprising first and second plies of fabric that define a plurality of first and second pockets formed along a length of the first string, the pockets being formed by vertical seams that join the plies, the vertical seams each including an upper slit that extends through top surfaces of the fabrics and a lower slit that extends through bottom surfaces of the fabrics, the upper and lower slits each having the same length, each of the first pockets comprising only one spring positioned therein, each of the second pockets comprising an outer spring and an inner spring positioned therein, the inner spring being positioned within the outer spring in a nested configuration, the second pockets of the first strings alternating with the first pockets of the first strings; and a plurality of second strings each comprising a plurality of first and second, the first pockets of the second strings each having only one spring positioned therein, the second pockets of the second strings each having an outer spring and an inner spring positioned therein, the inner spring being positioned within the outer spring in a nested configuration, the second pockets of the second strings alternating with the first pockets of the second strings, wherein each of the first strings is joined to another one of the first strings or one of the second strings to form the spring assembly such that the spring assembly extends from a first end to an opposite second end, wherein the spring assembly defines a first zone adjacent to the first end, a second zone adjacent to the second end and a third zone between the first and second zones, the first and second zones each comprising a plurality of the first strings, the third zone comprising a plurality of the second strings, the first zone having a firmness that is different than a firmness of the second zone, the third zone having a firmness that is different than a firmness of the first zone and a firmness of the second zones, and wherein the upper and lower slits of one of the first strings have different widths.

20. A spring assembly as recited in claim 19, wherein a firmness of the mattress assembly is controlled by the slits.

* * * * *